(12) United States Patent
Bone et al.

(10) Patent No.: US 10,488,618 B2
(45) Date of Patent: Nov. 26, 2019

(54) OPTICAL IMAGING LENS

(71) Applicant: Genius Electronic Optical Co., Ltd., Taichung (TW)

(72) Inventors: Matthew Bone, Fujian (CN); Baina Chen, Fujian (CN); Yanbin Chen, Fujian (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 15/490,911

(22) Filed: Apr. 19, 2017

(65) Prior Publication Data
US 2018/0299654 A1    Oct. 18, 2018

(30) Foreign Application Priority Data

Apr. 13, 2017 (CN) .......................... 2017 1 0239374

(51) Int. Cl.
*G02B 13/18* (2006.01)
*G02B 3/02* (2006.01)
*G02B 9/34* (2006.01)

(52) U.S. Cl.
CPC ...................................... *G02B 9/34* (2013.01)

(58) Field of Classification Search
CPC ........ G02B 13/18; G02B 9/34; G02B 13/004; G02B 13/22; G02B 13/04
See application file for complete search history.

(56) References Cited

U.S. PATENT DOCUMENTS

| 9,036,278 | B2 | 5/2015 | Asami | |
|---|---|---|---|---|
| 2010/0259632 | A1* | 10/2010 | Matsusaka | G02B 13/004 348/222.1 |
| 2011/0134543 | A1* | 6/2011 | Jung | G02B 13/004 359/715 |
| 2015/0260959 | A1* | 9/2015 | Yamakawa | G02B 13/06 359/740 |

FOREIGN PATENT DOCUMENTS

| JP | 2008-164989 A | 7/2008 |
|---|---|---|
| JP | 4747645 | 8/2011 |
| JP | WO2014/123137 A1 | 8/2014 |
| TW | 201523015 A | 6/2015 |

\* cited by examiner

*Primary Examiner* — Alicia M Harrington
(74) *Attorney, Agent, or Firm* — Winston Hsu

(57) ABSTRACT

An optical imaging lens includes a first lens of negative refractive power, a second lens of negative refractive power and of an image-side surface with a concave portion in a vicinity of its optical-axis, at least one of an object-side surface and of an image-side surface of a third lens being an aspherical surface and a fourth lens of an object-side surface with a concave portion in a vicinity of its optical-axis. An aperture stop is disposed between the first lens element and the third lens element. The Abbe number v1 of the first lens element and the Abbe number v4 of the fourth lens element satisfy $45 \le v1 \le 65$ or $18 \le v4 \le 35$.

19 Claims, 34 Drawing Sheets

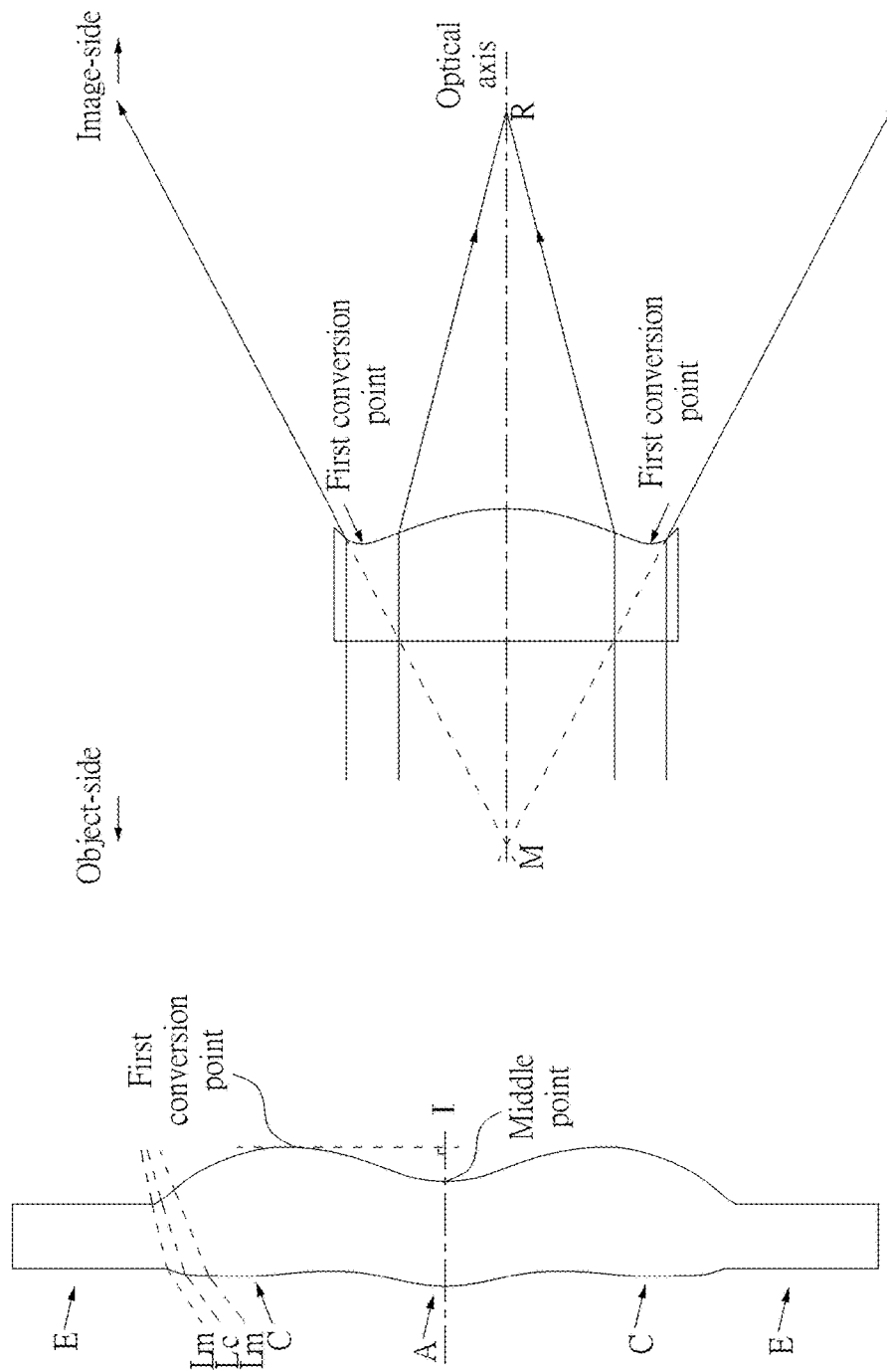

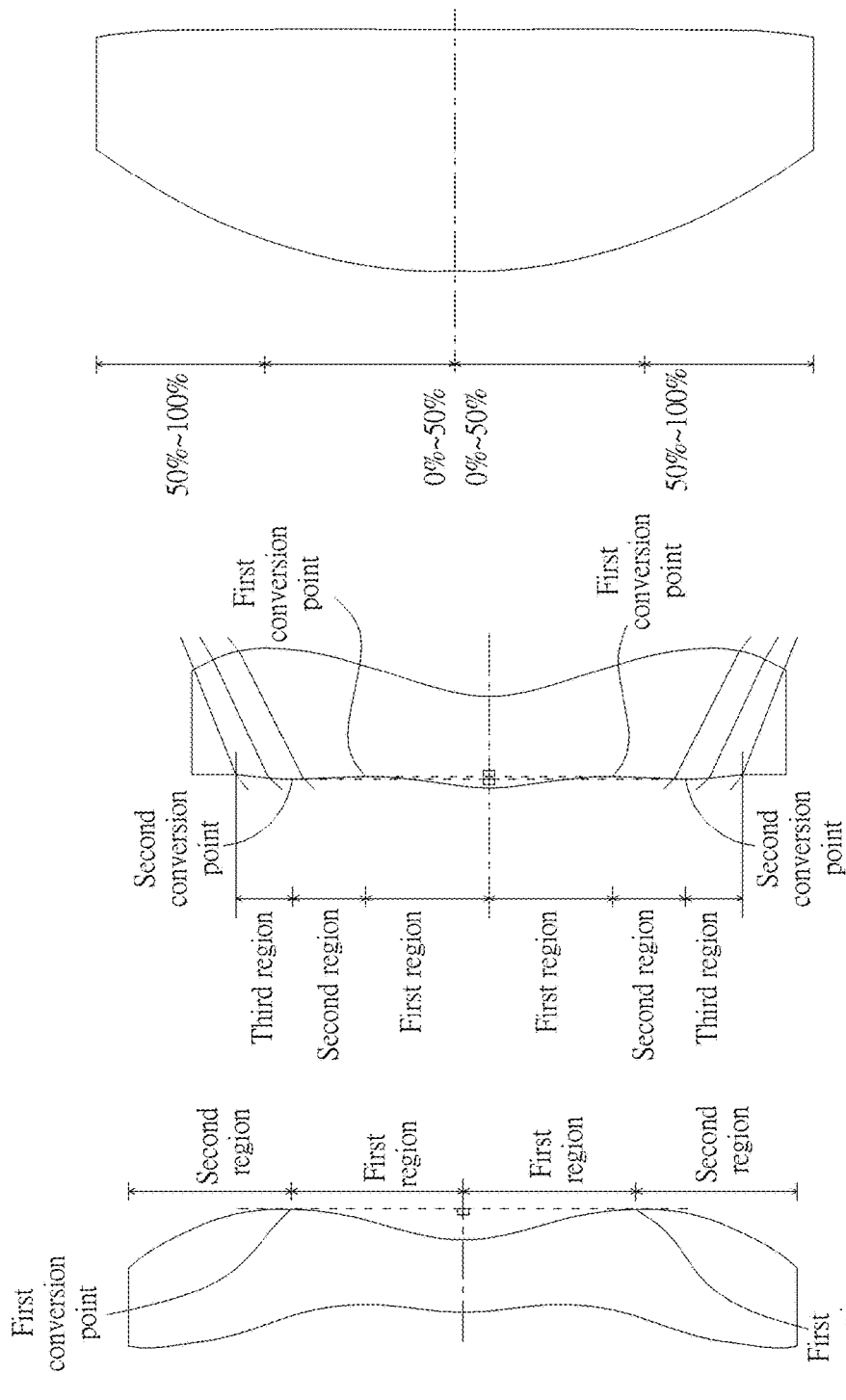

| First Example | | | | | | |
|---|---|---|---|---|---|---|
| EFL=0.9639 mm, HFOV= 90 Degrees, TTL= 6.3476 mm, Fno= 2.1 | | | | | | |
| No. | | Curvature Radius | Ape. Stop Lens Thickness Air Gap | | Refractive Index | Abbe No. | Focal Length |
| | Object | 1800 | 1800 | | | | |
| | VRS | 22.000 | 0.100 | | | | |
| 11 | First Lens | 11.168 | 0.450 | $T_1$ | 1.545 | 55.987 | -2.071 |
| 12 | | 0.997 | 0.543 | $G_{12}$ | | | |
| 21 | Second Lens | -1.639 | 0.516 | $T_2$ | 1.642 | 22.409 | -1.332 |
| 22 | | 1.879 | 0.323 | $G_{23}$ | | | |
| 80 | Ape. Stop | INFINITY | 0.147 | | | | |
| 31 | Third Lens | -66.067 | 0.727 | $T_3$ | 1.545 | 55.987 | 1.762 |
| 32 | | -0.937 | 0.095 | $G_{34}$ | | | |
| 41 | Fourth Lens | -2.832 | 0.517 | $T_4$ | 1.642 | 22.409 | 3.374 |
| 42 | | -1.290 | 0.478 | $G_{45}$ | | | |
| 70 | IR Filter | INFINITY | 0.210 | | 1.517 | 64.167 | |
| | | INFINITY | 2.342 | | | | |
| 71 | Image Plane | INFINITY | | | | | |

FIG.26

| No. | 11 | 12 | 21 | 22 |
|---|---|---|---|---|
| K | 0.000000E+00 | -7.120962E-01 | -2.809074E+01 | 0.000000E+00 |
| A2 | 0.000000E+00 | 0.000000E+00 | 0.000000E+00 | 0.000000E+00 |
| A4 | -2.570714E-03 | -4.014090E-04 | 4.652559E-02 | 8.141209E-01 |
| A6 | 1.364909E-03 | 3.835277E-02 | -7.970462E-02 | 1.574816E+00 |
| A8 | 0.000000E+00 | 0.000000E+00 | 0.000000E+00 | 0.000000E+00 |
| No. | 31 | 32 | 41 | 42 |
| K | 0.000000E+00 | -2.939412E-01 | 6.624881E+00 | 0.000000E+00 |
| A2 | 0.000000E+00 | 0.000000E+00 | 0.000000E+00 | 0.000000E+00 |
| A4 | -1.674923E-01 | 4.822782E-02 | 1.417536E-02 | -5.438525E-03 |
| A6 | 3.336008E-01 | -6.670296E-03 | 1.024476E-01 | 3.370667E-02 |
| A8 | 0.000000E+00 | 0.000000E+00 | 8.596970E-03 | 4.454748E-02 |

FIG.27

| Second Example ||||||
|---|---|---|---|---|---|
| EFL=0.7280 mm, HFOV=90 Degrees, TTL= 6.1509 mm, Fno= 2.0 ||||||
| No. | | Curvature Radius | Ape. Stop Lens Thickness Air Gap | | Refractive Index | Abbe No. | Focal Length |
| | Object | 1800 | 1800 | | | | |
| | VRS | 18.000 | 0.100 | | | | |
| 11 | First Lens | 10.399 | 0.402 | $T_1$ | 1.545 | 55.987 | -2.028 |
| 12 | | 0.972 | 1.039 | $G_{12}$ | | | |
| 21 | Second Lens | -4.090 | 0.496 | $T_2$ | 1.642 | 22.409 | -3.856 |
| 22 | | 6.074 | 0.422 | $G_{23}$ | | | |
| 80 | Ape. Stop | INFINITY | 0.225 | | | | |
| 31 | Third Lens | 16.675 | 0.636 | $T_3$ | 1.545 | 55.987 | 1.558 |
| 32 | | -0.869 | 0.642 | $G_{34}$ | | | |
| 41 | Fourth Lens | -3.759 | 0.845 | $T_4$ | 1.642 | 22.409 | 2.757 |
| 42 | | -1.279 | 0.478 | $G_{45}$ | | | |
| 70 | IR Filter | INFINITY | 0.210 | | 1.517 | 64.167 | |
| | | INFINITY | 0.755 | | | | |
| 71 | Image Plane | INFINITY | | | | | |

FIG.28

| No. | 11 | 12 | 21 | 22 |
|---|---|---|---|---|
| K | 0.000000E+00 | -3.697744E-01 | -5.961438E+01 | 0.000000E+00 |
| A2 | 0.000000E+00 | 0.000000E+00 | 0.000000E+00 | 0.000000E+00 |
| A4 | 1.520026E-03 | 2.028627E-02 | 1.142810E-01 | 4.005113E-01 |
| A6 | 4.055242E-06 | -3.024759E-03 | -4.588869E-02 | 2.725913E-01 |
| A8 | 0.000000E+00 | 0.000000E+00 | 0.000000E+00 | 0.000000E+00 |
| No. | 31 | 32 | 41 | 42 |
| K | 0.000000E+00 | -4.273408E-01 | 8.540908E+00 | 0.000000E+00 |
| A2 | 0.000000E+00 | 0.000000E+00 | 0.000000E+00 | 0.000000E+00 |
| A4 | -1.769694E-01 | 3.308816E-02 | 4.551761E-02 | 9.327550E-02 |
| A6 | 2.395218E-01 | 7.661334E-02 | 1.081292E-01 | 1.454188E-02 |
| A8 | 0.000000E+00 | 0.000000E+00 | -2.795206E-02 | 4.849671E-02 |

FIG.29

| Third Example ||||||||
|---|---|---|---|---|---|---|---|
| EFL=1.1840, HFOV=90 Degrees, TTL=4.7622 mm, Fno= 2.2 ||||||||
| No. | | Curvature Radius | Ape. Stop Lens Thickness Air Gap || Refractive Index | Abbe No. | Focal Length |
| | Object | 1800 | 1800 ||| | |
| | VRS | 22.000 | 0.100 ||| | |
| 11 | First Lens | 4.852 | 0.735 | $T_1$ | 1.545 | 55.987 | -3.023 |
| 12 | | 1.152 | 0.288 | $G_{12}$ | | | |
| 21 | Second Lens | -1.881 | 0.419 | $T_2$ | 1.642 | 22.409 | -2.888 |
| 22 | | 43.558 | 0.047 | $G_{23}$ | | | |
| 80 | Ape. Stop | INFINITY | 0.013 | | | | |
| 31 | Third Lens | 183.247 | 0.720 | $T_3$ | 1.545 | 55.987 | 1.454 |
| 32 | | -0.783 | 0.077 | $G_{34}$ | | | |
| 41 | Fourth Lens | -2.693 | 0.572 | $T_4$ | 1.642 | 22.409 | 2.967 |
| 42 | | -1.184 | 0.478 | $G_{45}$ | | | |
| 70 | IR Filter | INFINITY | 0.210 || 1.517 | 64.167 | |
| | | INFINITY | 1.205 ||| | |
| 71 | Image Plane | INFINITY ||||| |

FIG.30

| No. | 11 | 12 | 21 | 22 |
|---|---|---|---|---|
| K | 0.000000E+00 | -8.080388E-02 | -4.612888E+00 | 0.000000E+00 |
| A2 | 0.000000E+00 | 0.000000E+00 | 0.000000E+00 | 0.000000E+00 |
| A4 | -8.474954E-03 | 6.938843E-02 | 1.473535E-01 | 7.148272E-01 |
| A6 | -1.892248E-03 | -1.358776E-01 | -5.674646E-02 | 1.997297E+00 |
| A8 | 0.000000E+00 | 0.000000E+00 | 0.000000E+00 | 0.000000E+00 |
| No. | 31 | 32 | 41 | 42 |
| K | 0.000000E+00 | -1.941515E-01 | 6.611172E+00 | 0.000000E+00 |
| A2 | 0.000000E+00 | 0.000000E+00 | 0.000000E+00 | 0.000000E+00 |
| A4 | -1.742788E-01 | 7.409341E-02 | 1.725045E-02 | -3.280680E-02 |
| A6 | 1.421899E+00 | -3.424433E-02 | 4.506084E-02 | -2.661021E-03 |
| A8 | 0.000000E+00 | 0.000000E+00 | 1.097622E-02 | 2.818159E-02 |

FIG.31

| Fourth Example ||||||
|---|---|---|---|---|---|
| EFL= 0.8893 mm, HFOV=90 Degrees, TTL= 5.2838 mm, Fno= 2.0 ||||||
| No. | | Curvature Radius | Ape. Stop Lens Thickness Air Gap | | Refractive Index | Abbe No. | Focal Length |
| | Object | 1800 | 1800 | | | | |
| | VRS | 22.000 | 0.100 | | | | |
| 11 | First Lens | 6.811 | 0.634 | $T_1$ | 1.545 | 55.987 | -2.830 |
| 12 | | 1.202 | 0.632 | $G_{12}$ | | | |
| 21 | Second Lens | -2.254 | 0.463 | $T_2$ | 1.642 | 22.409 | -3.622 |
| 22 | | 29080533801.463 | 0.146 | $G_{23}$ | | | |
| 80 | Ape. Stop | INFINITY | 0.089 | | | | |
| 31 | Third Lens | 5.683 | 1.076 | $T_3$ | 1.545 | 55.987 | 1.514 |
| 32 | | -0.886 | 0.049 | $G_{34}$ | | | |
| 41 | Fourth Lens | -2.948 | 0.505 | $T_4$ | 1.642 | 22.409 | 3.191 |
| 42 | | -1.264 | 0.478 | $G_{45}$ | | | |
| 70 | IR Filter | INFINITY | 0.210 | | 1.517 | 64.167 | |
| | | INFINITY | 1.002 | | | | |
| 71 | Image Plane | INFINITY | | | | | |

FIG.32

| No. | 11 | 12 | 21 | 22 |
|---|---|---|---|---|
| K | 0.000000E+00 | -5.916909E-01 | -2.663723E+01 | 0.000000E+00 |
| A2 | 0.000000E+00 | 0.000000E+00 | 0.000000E+00 | 0.000000E+00 |
| A4 | -2.469919E-03 | 5.494521E-02 | 1.334940E-01 | 5.930700E-01 |
| A6 | -2.903792E-04 | -7.783121E-02 | -4.565732E-02 | 7.899681E-01 |
| A8 | 0.000000E+00 | 0.000000E+00 | 0.000000E+00 | 0.000000E+00 |
| No. | 31 | 32 | 41 | 42 |
| K | 0.000000E+00 | -3.868299E-01 | 6.420365E+00 | 0.000000E+00 |
| A2 | 0.000000E+00 | 0.000000E+00 | 0.000000E+00 | 0.000000E+00 |
| A4 | -1.591416E-01 | 1.132755E-01 | -5.134376E-03 | -1.816261E-03 |
| A6 | 4.282600E-01 | 5.015123E-02 | 1.001740E-01 | 2.744300E-02 |
| A8 | 0.000000E+00 | 0.000000E+00 | -1.826417E-02 | 3.833117E-02 |

FIG.33

| Fifth Example |||||||
|---|---|---|---|---|---|---|
| EFL= 0.8648 mm, HFOV=90 Degrees, TTL= 5.4824 mm, Fno= 2.0 |||||||
| No. | | Curvature Radius | Ape. Stop Lens Thickness Air Gap | | Refractive Index | Abbe No. | Focal Length |
| | Object | 1800 | 1800 | | | | |
| | VRS | 22.000 | 0.100 | | | | |
| 11 | First Lens | 7.348 | 0.466 | $T_1$ | 1.545 | 55.987 | -2.975 |
| 12 | | 1.283 | 0.550 | $G_{12}$ | | | |
| 21 | Second Lens | -1.632 | 0.460 | $T_2$ | 1.642 | 22.409 | -2.623 |
| 22 | | 16979495036.019 | 0.457 | $G_{23}$ | | | |
| 80 | Ape. Stop | INFINITY | 0.266 | | | | |
| 31 | Third Lens | 5.441 | 0.519 | $T_3$ | 1.545 | 55.987 | 1.534 |
| 32 | | -0.938 | 0.087 | $G_{34}$ | | | |
| 41 | Fourth Lens | -3.509 | 0.932 | $T_4$ | 1.642 | 22.409 | 3.058 |
| 42 | | -1.359 | 0.478 | $G_{45}$ | | | |
| 70 | IR Filter | INFINITY | 0.210 | | 1.517 | 64.167 | |
| | | INFINITY | 1.057 | | | | |
| 71 | Image Plane | INFINITY | | | | | |

FIG.34

| No. | 11 | 12 | 21 | 22 |
|---|---|---|---|---|
| K | 0.000000E+00 | -4.320941E-01 | -1.808070E+01 | 0.000000E+00 |
| A2 | 0.000000E+00 | 0.000000E+00 | 0.000000E+00 | 0.000000E+00 |
| A4 | -2.303938E-03 | 6.393477E-02 | 1.440358E-01 | 5.736793E-01 |
| A6 | -3.216585E-05 | -1.050820E-01 | -5.586301E-02 | 6.321296E-01 |
| A8 | 0.000000E+00 | 0.000000E+00 | 0.000000E+00 | 0.000000E+00 |
| No. | 31 | 32 | 41 | 42 |
| K | 0.000000E+00 | -3.611555E-01 | 5.856400E+00 | 0.000000E+00 |
| A2 | 0.000000E+00 | 0.000000E+00 | 0.000000E+00 | 0.000000E+00 |
| A4 | -1.412573E-01 | 1.125644E-01 | 2.164735E-02 | 2.114222E-02 |
| A6 | 1.227422E-01 | 3.671955E-02 | 1.031963E-01 | 2.417056E-02 |
| A8 | 0.000000E+00 | 0.000000E+00 | -3.610844E-02 | 3.338718E-02 |

FIG.35

| Sixth Example ||||||
|---|---|---|---|---|---|
| EFL= 0.8748 mm, HFOV=90 Degrees, TTL=6.8982 mm, Fno= 2.2 ||||||
| No. | | Curvature Radius | Ape. Stop Lens Thickness Air Gap | Refractive Index | Abbe No. | Focal Length |
| | Object | 1800 | 1800 | | | |
| | VRS | 22.000 | 0.100 | | | |
| 11 | First Lens | 6.505 | 1.692 $T_1$ | 1.545 | 55.987 | -2.764 |
| 12 | | 1.099 | 0.424 $G_{12}$ | | | |
| 21 | Second Lens | -1.869 | 0.538 $T_2$ | 1.642 | 22.409 | -1.734 |
| 22 | | 2.836 | 0.269 $G_{23}$ | | | |
| 80 | Ape. Stop | INFINITY | 0.242 | | | |
| 31 | Third Lens | 56.406 | 0.854 $T_3$ | 1.545 | 55.987 | 1.586 |
| 32 | | -0.860 | 0.182 $G_{34}$ | | | |
| 41 | Fourth Lens | -3.116 | 0.654 $T_4$ | 1.642 | 22.409 | 3.018 |
| 42 | | -1.266 | 0.478 $G_{45}$ | | | |
| 70 | IR Filter | INFINITY | 0.210 | 1.517 | 64.167 | |
| | | INFINITY | 1.356 | | | |
| 71 | Image Plane | INFINITY | | | | |

FIG.36

| No. | 11 | 12 | 21 | 22 |
|---|---|---|---|---|
| K | 0.000000E+00 | -2.199711E+00 | -2.662589E+01 | 0.000000E+00 |
| a2 | 0.000000E+00 | 0.000000E+00 | 0.000000E+00 | 0.000000E+00 |
| a4 | -2.215971E-03 | 3.828903E-02 | 1.220433E-01 | 8.187796E-01 |
| a6 | -9.151097E-05 | -7.863633E-02 | -6.372734E-02 | 6.722164E-01 |
| a8 | 4.871114E-07 | 2.336427E-01 | 8.182946E-07 | -4.763849E-04 |
| a10 | 3.778516E-08 | 8.830786E-02 | 1.084906E-06 | -2.493500E-03 |
| a12 | 9.853875E-09 | -7.137273E-02 | 7.106506E-07 | -1.144836E-02 |
| a14 | 0.000000E+00 | 0.000000E+00 | 0.000000E+00 | 0.000000E+00 |
| No. | 41 | 42 | 51 | 52 |
| K | 0.000000E+00 | -3.084924E-01 | 6.181225E+00 | 0.000000E+00 |
| a2 | 0.000000E+00 | 0.000000E+00 | 0.000000E+00 | 0.000000E+00 |
| a4 | -2.432461E-01 | 5.245313E-02 | 4.429434E-03 | 5.778677E-02 |
| a6 | 3.141291E-01 | 2.168259E-02 | 1.449432E-01 | -3.873981E-03 |
| a8 | 0.000000E+00 | 1.701996E-01 | -4.302692E-02 | 2.639160E-02 |
| a10 | 5.031612E-01 | 1.589107E-01 | -1.763589E-02 | 1.790125E-03 |
| a12 | 1.917570E+00 | -1.031767E-02 | -6.286962E-04 | 2.467902E-03 |
| a14 | -1.072838E+01 | -2.708814E-01 | 9.932136E-03 | 1.144382E-03 |

FIG.37

| | | Seventh Example | | | | |
|---|---|---|---|---|---|---|
| | | EFL= 0.8524 mm, HFOV=90 Degrees, TTL=5.4489 mm, Fno= 2.0 | | | | |
| No. | | Curvature Radius | Ape. Stop Lens Thickness Air Gap | | Refractive Index | Abbe No. | Focal Length |
| | Object | 1800 | 1800 | | | | |
| | VRS | 22.000 | 0.100 | | | | |
| 11 | First Lens | 7.139 | 0.830 | $T_1$ | 1.545 | 55.987 | -1.662 |
| 12 | | 0.761 | 0.554 | $G_{12}$ | | | |
| 21 | Second Lens | -2.083 | 0.250 | $T_2$ | 1.642 | 22.409 | -3.264 |
| 22 | | 85.706 | 0.235 | $G_{23}$ | | | |
| 80 | Ape. Stop | INFINITY | 0.127 | | | | |
| 31 | Third Lens | 6.516 | 0.798 | $T_3$ | 1.545 | 55.987 | 1.392 |
| 32 | | -0.808 | 0.449 | $G_{34}$ | | | |
| 41 | Fourth Lens | -3.272 | 0.542 | $T_4$ | 1.642 | 22.409 | 3.090 |
| 42 | | -1.288 | 0.478 | $G_{45}$ | | | |
| 70 | IR Filter | INFINITY | 0.210 | | 1.517 | 64.167 | |
| | | INFINITY | 0.977 | | | | |
| 71 | Image Plane | INFINITY | | | | | |

FIG.38

| No. | 11 | 12 | 21 | 22 |
|---|---|---|---|---|
| K | 0.000000E+00 | -6.911920E-01 | -2.593931E+01 | 0.000000E+00 |
| A2 | 0.000000E+00 | 0.000000E+00 | 0.000000E+00 | 0.000000E+00 |
| A4 | 6.400231E-04 | 1.671530E-01 | 1.896832E-01 | 7.463764E-01 |
| A6 | -2.995801E-04 | 1.540241E-01 | -7.192952E-02 | 3.596929E-01 |
| A8 | 0.000000E+00 | 0.000000E+00 | 0.000000E+00 | 0.000000E+00 |
| No. | 31 | 32 | 41 | 42 |
| K | 0.000000E+00 | -2.775167E-01 | 7.049078E+00 | 0.000000E+00 |
| A2 | 0.000000E+00 | 0.000000E+00 | 0.000000E+00 | 0.000000E+00 |
| A4 | -1.881837E-01 | 9.653206E-02 | 9.136415E-05 | 1.810273E-02 |
| A6 | 2.636362E-01 | 5.032470E-02 | 8.202804E-02 | 4.768266E-02 |
| A8 | 0.000000E+00 | 0.000000E+00 | -1.736260E-02 | 2.513405E-02 |

FIG.39

| \multicolumn{7}{|c|}{Eighth Example} |
|---|---|---|---|---|---|---|
| \multicolumn{7}{|c|}{EFL=0.9928 mm, HFOV=90 Degrees, TTL=5.7005 mm, Fno= 2.2} |
| No. | | Curvature Radius | Ape. Stop Lens Thickness Air Gap | | Refractive Index | Abbe No. | Focal Length |
| | Object | 1800 | 1800 | | | | |
| | VRS | 22.000 | 0.100 | | | | |
| 11 | First Lens | 4.338 | 0.644 | $T_1$ | 1.545 | 55.987 | -4.312 |
| 12 | | 1.431 | 0.269 | $G_{12}$ | | | |
| 21 | Second Lens | -2.191 | 0.418 | $T_2$ | 1.642 | 22.409 | -1.627 |
| 22 | | 2.019 | 0.367 | $G_{23}$ | | | |
| 80 | Ape. Stop | INFINITY | 0.292 | | | | |
| 31 | Third Lens | 95.562 | 0.736 | $T_3$ | 1.545 | 55.987 | 1.694 |
| 32 | | -0.916 | 0.017 | $G_{34}$ | | | |
| 41 | Fourth Lens | -3.131 | 0.761 | $T_4$ | 1.642 | 22.409 | 3.001 |
| 42 | | -1.279 | 0.478 | $G_{45}$ | | | |
| 70 | IR Filter | INFINITY | 0.210 | | 1.517 | 64.167 | |
| | | INFINITY | 1.509 | | | | |
| 71 | Image Plane | INFINITY | | | | | |

FIG.40

| No. | 11 | 12 | 21 | 22 |
|---|---|---|---|---|
| K | 0.000000E+00 | -1.989903E+00 | -3.914129E+01 | 0.000000E+00 |
| A2 | 0.000000E+00 | 0.000000E+00 | 0.000000E+00 | 0.000000E+00 |
| A4 | -1.538478E-02 | -6.927956E-02 | 1.642492E-01 | 9.885769E-01 |
| A6 | -1.749061E-03 | -3.449590E-02 | -8.795641E-02 | 5.360867E-01 |
| A8 | 0.000000E+00 | 0.000000E+00 | 0.000000E+00 | 0.000000E+00 |
| No. | 31 | 32 | 41 | 42 |
| K | 0.000000E+00 | -3.204439E-01 | 6.745178E+00 | 0.000000E+00 |
| A2 | 0.000000E+00 | 0.000000E+00 | 0.000000E+00 | 0.000000E+00 |
| A4 | -2.375992E-01 | 4.397835E-02 | 4.854575E-02 | 4.949054E-02 |
| A6 | 1.954922E-01 | 9.370533E-02 | 7.052457E-02 | -1.829173E-02 |
| A8 | 0.000000E+00 | 0.000000E+00 | -1.532866E-02 | 3.843598E-02 |

FIG.41

| Ninth Example ||||||
|---|---|---|---|---|---|
| EFL=0.9276 mm, HFOV=90 Degrees, TTL=5.3347 mm, Fno= 2.0 ||||||
| No. | | Curvature Radius | Ape. Stop Lens Thickness Air Gap | | Refractive Index | Abbe No. | Focal Length |
| | Object | 1800 | 1800 | | | | |
| | VRS | 22.000 | 0.100 | | | | |
| 11 | First Lens | 5.200 | 0.602 | $T_1$ | 1.540 | 59.709 | -3.236 |
| 12 | | 1.242 | 0.475 | $G_{12}$ | | | |
| 21 | Second Lens | -1.889 | 0.418 | $T_2$ | 1.642 | 22.409 | -2.233 |
| 22 | | 5.700 | 0.267 | $G_{23}$ | | | |
| 80 | Ape. Stop | INFINITY | 0.221 | | | | |
| 31 | Third Lens | 33.102 | 0.736 | $T_3$ | 1.545 | 55.987 | 1.522 |
| 32 | | -0.832 | 0.090 | $G_{34}$ | | | |
| 41 | Fourth Lens | -3.078 | 0.650 | $T_4$ | 1.617 | 30.973 | 3.117 |
| 42 | | -1.258 | 0.478 | $G_{45}$ | | | |
| 70 | IR Filter | INFINITY | 0.210 | | 1.517 | 64.167 | |
| | | INFINITY | 1.188 | | | | |
| 71 | Image Plane | INFINITY | | | | | |

FIG.42

| No. | 11 | 12 | 21 | 22 |
|---|---|---|---|---|
| K | 0.000000E+00 | -6.977546E-01 | -2.476166E+01 | 0.000000E+00 |
| A2 | 0.000000E+00 | 0.000000E+00 | 0.000000E+00 | 0.000000E+00 |
| A4 | -2.089725E-03 | 5.878733E-02 | 1.427413E-01 | 8.195351E-01 |
| A6 | -1.712815E-04 | -9.706540E-02 | -6.165688E-02 | 6.900578E-01 |
| A8 | 0.000000E+00 | 0.000000E+00 | 0.000000E+00 | 0.000000E+00 |
| No. | 31 | 32 | 41 | 42 |
| K | 0.000000E+00 | -3.495830E-01 | 6.733715E+00 | 0.000000E+00 |
| A2 | 0.000000E+00 | 0.000000E+00 | 0.000000E+00 | 0.000000E+00 |
| A4 | -2.111165E-01 | 1.020626E-01 | 8.860780E-03 | -1.483271E-03 |
| A6 | 2.379953E-01 | 5.040376E-02 | 9.879205E-02 | 2.230980E-02 |
| A8 | 0.000000E+00 | 0.000000E+00 | -2.286797E-02 | 3.725145E-02 |

FIG.43

| Tenth Example ||||||
|---|---|---|---|---|---|
| EFL=0.8766 mm, HFOV=90 Degrees, TTL=4.8042 mm, Fno= 2.2 ||||||
| No. | | Curvature Radius | Ape. Stop Lens Thickness Air Gap | Refractive Index | Abbe No. | Focal Length |
| | Object | 1800 | 1800 | | | |
| | VRS | 22.000 | 0.100 | | | |
| 11 | First Lens | -84.889 | 0.829 | $T_1$ | 1.545 | 55.987 | -1.094 |
| 12 | | 0.594 | 0.497 | $G_{12}$ | | | |
| 80 | Ape. Stop | INFINITY | 0.000 | | | |
| 21 | Second Lens | 3.413 | 0.395 | $T_2$ | 1.642 | 22.409 | -79.471 |
| 22 | | 3.051 | 0.154 | $G_{23}$ | | | |
| 31 | Third Lens | 3.124 | 0.603 | $T_3$ | 1.545 | 55.987 | 1.303 |
| 32 | | -0.840 | 0.030 | $G_{34}$ | | | |
| 41 | Fourth Lens | -2.917 | 0.514 | $T_4$ | 1.642 | 22.409 | 3.282 |
| 42 | | -1.282 | 0.478 | $G_{45}$ | | | |
| 70 | IR Filter | INFINITY | 0.210 | | 1.517 | 64.167 | |
| | | INFINITY | 1.094 | | | | |
| 71 | Image Plane | INFINITY | | | | | |

FIG.44

| No. | 11 | 12 | 21 | 22 |
|---|---|---|---|---|
| K | 0.000000E+00 | 1.097649E-01 | -2.810195E+01 | 0.000000E+00 |
| A2 | 0.000000E+00 | 0.000000E+00 | 0.000000E+00 | 0.000000E+00 |
| A4 | 8.583035E-03 | -3.767517E-02 | -7.345268E-02 | -1.624483E-01 |
| A6 | -1.195394E-03 | -4.607307E-01 | -2.181616E-03 | 2.855428E-01 |
| A8 | 0.000000E+00 | 0.000000E+00 | 0.000000E+00 | 0.000000E+00 |
| No. | 31 | 32 | 41 | 42 |
| K | 0.000000E+00 | -6.680492E-01 | 6.664597E+00 | 0.000000E+00 |
| A2 | 0.000000E+00 | 0.000000E+00 | 0.000000E+00 | 0.000000E+00 |
| A4 | -2.885737E-01 | 1.040985E-01 | 1.946847E-02 | -4.345544E-02 |
| A6 | 2.308456E-01 | -8.926530E-02 | 8.568420E-02 | 7.834141E-02 |
| A8 | 0.000000E+00 | 0.000000E+00 | -3.320655E-02 | -1.687811E-02 |

FIG.45

| Example | 1st | 2nd | 3rd | 4th | 5th | 6th | 7th | 8th | 9th | 10th |
|---|---|---|---|---|---|---|---|---|---|---|
| EFL | 0.964 | 0.728 | 1.184 | 0.889 | 0.865 | 0.875 | 0.852 | 0.993 | 0.928 | 0.877 |
| T1 | 0.450 | 0.402 | 0.735 | 0.634 | 0.466 | 1.692 | 0.830 | 0.644 | 0.602 | 0.829 |
| G12 | 0.543 | 1.039 | 0.288 | 0.632 | 0.550 | 0.424 | 0.554 | 0.269 | 0.475 | 0.497 |
| T2 | 0.516 | 0.496 | 0.419 | 0.463 | 0.917 | 0.807 | 0.485 | 0.784 | 0.685 | 0.395 |
| G23 | 0.469 | 0.647 | 0.060 | 0.235 | 0.266 | 0.242 | 0.127 | 0.292 | 0.221 | 0.154 |
| T3 | 0.727 | 0.636 | 0.720 | 1.076 | 0.519 | 0.854 | 0.798 | 0.736 | 0.736 | 0.603 |
| G34 | 0.095 | 0.642 | 0.077 | 0.049 | 0.087 | 0.182 | 0.449 | 0.017 | 0.090 | 0.030 |
| T4 | 0.517 | 0.845 | 0.572 | 0.505 | 0.932 | 0.654 | 0.542 | 0.761 | 0.650 | 0.514 |
| G4F | 0.478 | 0.478 | 0.478 | 0.478 | 0.478 | 0.478 | 0.478 | 0.478 | 0.478 | 0.478 |
| TF | 0.210 | 0.210 | 0.210 | 0.210 | 0.210 | 0.210 | 0.210 | 0.210 | 0.210 | 0.210 |
| GFP | 2.342 | 0.755 | 1.205 | 1.002 | 1.057 | 1.356 | 0.977 | 1.509 | 1.188 | 1.094 |
| BFL | 3.030 | 1.443 | 1.892 | 1.689 | 1.745 | 2.044 | 1.664 | 2.197 | 1.875 | 1.781 |
| ALT | 2.211 | 2.379 | 2.446 | 2.678 | 2.834 | 4.006 | 2.656 | 2.926 | 2.672 | 2.342 |
| AAG | 1.107 | 2.329 | 0.424 | 0.917 | 0.903 | 0.848 | 1.129 | 0.578 | 0.787 | 0.681 |
| TTL | 6.348 | 6.151 | 4.762 | 5.284 | 5.482 | 6.898 | 5.449 | 5.700 | 5.335 | 4.804 |

FIG.46

| Example | 1st | 2nd | 3rd | 4th | 5th | 6th | 7th | 8th | 9th | 10th |
|---|---|---|---|---|---|---|---|---|---|---|
| (EFL+ALT)/BFL | 1.048 | 2.154 | 1.918 | 2.112 | 2.120 | 2.388 | 2.108 | 1.784 | 1.920 | 1.807 |
| (G12+G23)/T1 | 2.248 | 4.199 | 0.472 | 1.369 | 1.752 | 0.394 | 0.820 | 0.872 | 1.157 | 0.785 |
| (G12+G23)/T2 | 1.961 | 3.403 | 0.828 | 1.873 | 0.890 | 0.826 | 1.404 | 0.716 | 1.018 | 1.648 |
| (G23+G34+T4)/T2 | 2.096 | 4.307 | 1.690 | 1.704 | 1.400 | 1.336 | 2.304 | 1.365 | 1.405 | 1.767 |
| (T2+G23)/T1 | 2.189 | 2.845 | 0.651 | 1.102 | 2.539 | 0.620 | 0.737 | 1.672 | 1.504 | 0.662 |
| (T3+G23)/T4 | 2.312 | 1.518 | 1.363 | 2.597 | 0.843 | 1.676 | 1.706 | 1.350 | 1.472 | 1.473 |
| (T4+G23)/T3 | 1.357 | 2.346 | 0.877 | 0.688 | 2.309 | 1.050 | 0.838 | 1.433 | 1.185 | 1.108 |
| (T1+G34)/G12 | 1.005 | 1.004 | 2.822 | 1.080 | 1.005 | 4.421 | 2.307 | 2.456 | 1.457 | 1.729 |
| (T3+G34)/T1 | 1.826 | 3.182 | 1.085 | 1.775 | 1.299 | 0.612 | 1.502 | 1.168 | 1.372 | 0.763 |
| (EFL+AAG)/(T2+T4) | 2.004 | 2.279 | 1.622 | 1.865 | 0.956 | 1.179 | 1.929 | 1.016 | 1.285 | 1.714 |
| (G12+G23)/T4 | 1.956 | 1.995 | 0.607 | 1.718 | 0.877 | 1.019 | 1.256 | 0.737 | 1.072 | 1.267 |
| (G12+G34)/T2 | 1.236 | 3.392 | 0.869 | 1.471 | 0.694 | 0.750 | 2.067 | 0.364 | 0.826 | 1.334 |
| (T1+G23)/T3 | 1.265 | 1.649 | 1.103 | 0.808 | 1.412 | 2.266 | 1.198 | 1.273 | 1.120 | 1.631 |
| (T2+G23)/G12 | 1.816 | 1.100 | 1.665 | 1.105 | 2.151 | 2.476 | 1.104 | 4.002 | 1.906 | 1.105 |
| (T3+G23)/T1 | 2.657 | 3.196 | 1.061 | 2.069 | 1.684 | 0.648 | 1.114 | 1.596 | 1.589 | 0.913 |
| (T4+G23)/T2 | 1.912 | 3.012 | 1.507 | 1.598 | 1.306 | 1.111 | 1.379 | 1.344 | 1.273 | 1.691 |
| (T4+G34)/G12 | 1.128 | 1.431 | 2.257 | 0.877 | 1.850 | 1.972 | 1.788 | 2.892 | 1.558 | 1.094 |
| (T3+G34)/G12 | 1.514 | 1.230 | 2.772 | 1.780 | 1.100 | 2.443 | 2.250 | 2.796 | 1.738 | 1.274 |

FIG.47

OPTICAL IMAGING LENS

BACKGROUND OF THE INVENTION

1. Field of the Invention

The present invention generally relates to an optical imaging lens set. Specifically speaking, the present invention is directed to an optical imaging lens for use in portable electronic devices such as mobile phones, cameras, personal tablets, personal digital assistants (PDA), VR trackers or lenses in vehicles for taking pictures and for recording videos.

2. Description of the Prior Art

The specifications of portable electronic devices change all the time and the key element—optical imaging lens develops variously. The application is not just limited to take pictures and to record videos but also for the environmental surveillance, the dashboard cameras or the VR trackers. As far as a VR tracker is concerned, not only is a good imaging quality required but also a larger half field of view is needed for detecting a wider space. A larger half field of view usually deteriorates the imaging quality and makes the total lens assembly length longer so there is a need to increase the half field of view and keeps the total lens assembly length.

SUMMARY OF THE INVENTION

In light of the above, the present invention proposes an optical imaging lens with increased half field of view for detecting a wider space, with good imaging quality and of a proper total lens assembly length. The optical imaging lens of four lens elements of the present invention from an object side toward an image side in order along an optical axis has a first lens element, a second lens element, a third lens element and a fourth lens element. Each lens element respectively has an object-side surface which faces toward an object side as well as an image-side surface which faces toward an image side.

In one aspect of the present invention, the first lens element has negative refractive power. The second lens element has negative refractive power and the image-side surface of the second lens element has a concave portion in a vicinity of the optical-axis. At least one of an object-side surface and of an image-side surface of the third lens is an aspherical surface. The object-side surface of the fourth lens element has a concave portion in a vicinity of the optical-axis. An aperture stop is disposed between the first lens element and the third lens element. The optical imaging lens exclusively has four lens elements with refractive power, and the first lens element has an Abbe number v1 to satisfy the conditional formulae $45 \leq v1 \leq 65$.

In another aspect of the present invention, the first lens element has negative refractive power. The second lens element has negative refractive power and the image-side surface of the second lens element has a concave portion in a vicinity of the optical-axis. At least one of an object-side surface and of an image-side surface of the third lens is an aspherical surface. The object-side surface of the fourth lens element has a concave portion in a vicinity of the optical-axis. An aperture stop is disposed between the first lens element and the third lens element. The optical imaging lens exclusively has four lens elements with refractive power, and the fourth lens element has an Abbe number v4 to satisfy the conditional formulae $18 \leq v4 \leq 35$.

In the optical imaging lens of four lens elements of the present invention, EFL is an effective focal length of the optical imaging lens, ALT is a total thickness of all the four lens elements and BFL is a distance between the image-side surface of the fourth lens element and an image plane along the optical axis to satisfy $(EFL+ALT)/BFL \leq 2.40$.

In the optical imaging lens of four lens elements of the present invention, the first lens element has a first lens element thickness T1 along the optical axis, an air gap G12 is between the first lens element and the second lens element along the optical axis and an air gap G23 is between the second lens element and the third lens element along the optical axis to satisfy $(G12+G23)/T1 \leq 4.20$.

In the optical imaging lens of four lens elements of the present invention, the second lens element has a second lens element thickness T2 along the optical axis to satisfy $(G12+G23)/T2 \leq 4.20$.

In the optical imaging lens of four lens elements of the present invention, the fourth lens element has a fourth lens element thickness T4 along the optical axis and an air gap G34 is between the third lens element and the fourth lens element along the optical axis to satisfy $(G23+G34+T4)/T2 \leq 5.50$.

The optical imaging lens of four lens elements of the present invention satisfies $(T2+G23)/T1 \leq 3.20$.

In the optical imaging lens of four lens elements of the present invention, the third lens element has a third lens element thickness T3 along the optical axis to satisfy $(T3+G23)/T4 \leq 2.60$.

The optical imaging lens of four lens elements of the present invention satisfies $(T4+G23)/T3 \leq 3.30$.

The optical imaging lens of four lens elements of the present invention satisfies $(T1+G34)/G12 \leq 4.50$.

The optical imaging lens of four lens elements of the present invention satisfies $(T3+G34)/T1 \leq 3.20$.

In the optical imaging lens of four lens elements of the present invention, AAG is a sum of all three air gaps between each lens elements from the first lens element to the fourth lens element along the optical axis to satisfy $(EFL+AAG)/(T2+T4) \leq 2.80$.

The optical imaging lens of four lens elements of the present invention satisfies $(G12+G23)/T4 \leq 2.00$.

The optical imaging lens of four lens elements of the present invention satisfies $(G12+G34)/T2 \leq 4.00$.

The optical imaging lens of four lens elements of the present invention satisfies $(T1+G23)/T3 \leq 2.60$.

The optical imaging lens of four lens elements of the present invention satisfies $(T2+G23)/G12 \leq 7.00$.

The optical imaging lens of four lens elements of the present invention satisfies $(T3+G23)/T1 \leq 3.20$.

The optical imaging lens of four lens elements of the present invention satisfies $(T4+G23)/T2 \leq 3.60$.

The optical imaging lens of four lens elements of the present invention satisfies $(T4+G34)/G12 \leq 3.60$.

The optical imaging lens of four lens elements of the present invention satisfies $(T3+G34)/G12 \leq 2.80$.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region is a region in a vicinity of the optical axis or the region in a vicinity of its periphery of one lens element.

FIG. 26 shows the optical data of the first example of the optical imaging lens.

FIG. 27 shows the aspheric surface data of the first example.

FIG. 28 shows the optical data of the second example of the optical imaging lens.

FIG. 29 shows the aspheric surface data of the second example.

FIG. 30 shows the optical data of the third example of the optical imaging lens.

FIG. 31 shows the aspheric surface data of the third example.

FIG. 32 shows the optical data of the fourth example of the optical imaging lens.

FIG. 33 shows the aspheric surface data of the fourth example.

FIG. 34 shows the optical data of the fifth example of the optical imaging lens.

FIG. 35 shows the aspheric surface data of the fifth example.

FIG. 36 shows the optical data of the sixth example of the optical imaging lens.

FIG. 37 shows the aspheric surface data of the sixth example.

FIG. 38 shows the optical data of the seventh example of the optical imaging lens.

FIG. 39 shows the aspheric surface data of the seventh example.

FIG. 40 shows the optical data of the eighth example of the optical imaging lens.

FIG. 41 shows the aspheric surface data of the eighth example.

FIG. 42 shows the optical data of the ninth example of the optical imaging lens.

FIG. 43 shows the aspheric surface data of the ninth example.

FIG. 44 shows the optical data of the tenth example of the optical imaging lens.

FIG. 45 shows the aspheric surface data of the tenth example.

FIG. 46 shows some important ratios in the examples.

FIG. 47 shows some important ratios in the examples.

DETAILED DESCRIPTION

Figure 6:
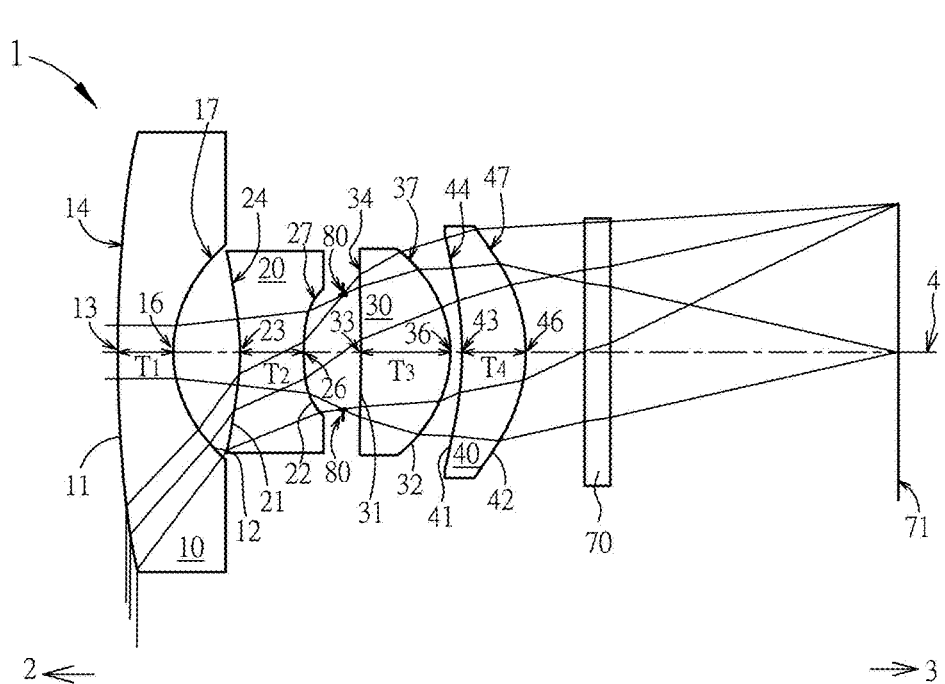
FIG. 6 illustrates a first example of the optical imaging lens of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the portion in a vicinity of the optical axis of the lens element has negative/positive refractive power calculated by Gaussian optical theory. An object-side/image-side surface refers to the region which allows imaging light passing through, in the drawing, imaging light includes Lc (chief ray) and Lm (marginal ray). As shown in FIG. 1, the optical axis is "I" and the lens element is symmetrical with respect to the optical axis I. The region A that near the optical axis and for light to pass through is the region in a vicinity of the optical axis, and the region C that the marginal ray passing through is the region in a vicinity of a certain lens element's periphery. In addition, the lens element may include an extension portion E for the lens element to be installed in an optical imaging lens (that is the region outside the region C perpendicular to the optical axis). Ideally speaking, no light would pass through the extension portion, and the actual structure and shape of the extension portion is not limited to this and may have other variations. For the reason of simplicity, the extension portion is not illustrated in the following examples. More, precisely, the method for determining the surface shapes or the region in a vicinity of the optical axis, the region in a vicinity of its periphery and other regions is described in the following paragraphs:

1. FIG. 1 is a radial cross-sectional view of a lens element. Before determining boundaries of those aforesaid portions, two referential points should be defined first, middle point and conversion point. The middle point of a surface of a lens element is a point of intersection of that surface and the optical axis. The conversion point is a point on a surface of a lens element, where the tangent line of that point is perpendicular to the optical axis. Additionally, if multiple conversion points appear on one single surface, then these conversion points are sequentially named along the radial direction of the surface with numbers starting from the first conversion point. For instance, the first conversion point (closest one to the optical axis), the second conversion point, and the Nth conversion point (farthest one to the optical axis within the scope of the clear aperture of the surface). The portion of a surface of the lens element between the middle point and the first conversion point is defined as the portion in a vicinity of the optical axis. The portion located radially outside of the $N^{th}$ conversion point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the conversion point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the middle point and the first conversion point has a convex shape, the portion located radially outside of the first conversion point has a concave shape, and the first conversion point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none conversion point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one conversion point, namely a first conversion point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first conversion point and a second conversion point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second conversion point (portion II).

Referring to a third example depicted in FIG. 5, no conversion point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

As shown in FIG. 6, the optical imaging lens 1 of four lens elements of the present invention, sequentially located from an object side 2 (where an object is located) to an image side 3 along an optical axis 4, has a first lens element 10, a second lens element 20, a third lens element 30, a fourth lens element 40, a filter 70 and an image plane 71. Generally speaking, the first lens element 10, the second lens element 20, the third lens element 30 and the fourth lens element 40 may be made of a transparent plastic material but the present invention is not limited to this, and each has an appropriate refractive power. There are exclusively four lens elements, which mean the first lens element 10, the second lens element 20, the third lens element 30 and the fourth lens element 40, with refractive power in the optical imaging lens 1 of the present invention. The optical axis 4 is the optical axis of the entire optical imaging lens 1, and the optical axis of each of the lens elements coincides with the optical axis of the optical imaging lens 1.

Furthermore, the optical imaging lens 1 includes an aperture stop (ape. stop) 80 disposed in an appropriate position. For example, the aperture stop 80 may be disposed between the first lens element 10 and the third lens element 30. In FIG. 6, the aperture stop 80 is disposed between the second lens element 20 and the third lens element 30. When light emitted or reflected by an object (not shown) which is located at the object side 2 enters the optical imaging lens 1 of the present invention, it forms a clear and sharp image on the image plane 71 at the image side 3 after passing through the first lens element 10, the second lens element 20, the aperture stop 80, the third lens element 30, the fourth lens element 40, and the filter 70. In one embodiments of the present invention, the optional filter 70 may be a filter of various suitable functions placed between the image-side surface 42 of the fourth lens element 40 and the image plane 71.

Each lens element in the optical imaging lens 1 of the present invention has an object-side surface facing toward the object side 2 as well as an image-side surface facing toward the image side 3. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42. In addition, each object-side surface and image-side surface in the optical imaging lens 1 of the present invention has a portion (or region) in a vicinity of its periphery (periphery region) away from the optical axis 4 as well as a portion in a vicinity of the optical axis (optical axis portion) close to the optical axis 4.

Each lens element in the optical imaging lens 1 of the present invention further has a central thickness T on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4. Therefore, the total thickness of all the lens elements in the optical imaging lens 1 along the optical axis 4 is ALT=T1+T2+T3+T4.

In addition, between two adjacent lens elements in the optical imaging lens 1 of the present invention there may be an air gap along the optical axis 4. For example, there is an air gap G12 disposed between the first lens element 10 and the second lens element 20, an air gap G23 disposed between the second lens element 20 and the third lens element 30 and an air gap G34 disposed between the third lens element 30 and the fourth lens element 40. Therefore, the sum of total three air gaps between adjacent lens elements from the first lens element 10 to the fourth lens element 40 along the optical axis 4 is AAG=G12+G23+G34.

In addition, the distance from the object-side surface 11 of the first lens element 10 to the image-side surface 42 of the fourth lens element 40 along the optical axis 4 is TL. The distance between the object-side surface 11 of the first lens element 10 to the image plane 71, namely the total length of the optical imaging lens along the optical axis 4 is TTL; the effective focal length of the optical imaging lens is EFL; the distance between the image-side surface 42 of the fourth lens element 40 and the image plane 71 along the optical axis 4 is BFL.

Furthermore, the focal length of the first lens element 10 is f1; the focal length of the second lens element 20 is f2; the focal length of the third lens element 30 is f3; the focal length of the fourth lens element 40 is f4; the refractive index of the first lens element 10 is n1; the refractive index of the second lens element 20 is n2; the refractive index of the third lens element 30 is n3; the refractive index of the fourth lens element 40 is n4; the Abbe number of the first lens element 10 is ν1; the Abbe number of the second lens element 20 is ν2; the Abbe number of the third lens element 30 is ν3; and the Abbe number of the fourth lens element 40 is ν4.

FIRST EXAMPLE

Figures 7A, 7B, 7C, 7D:
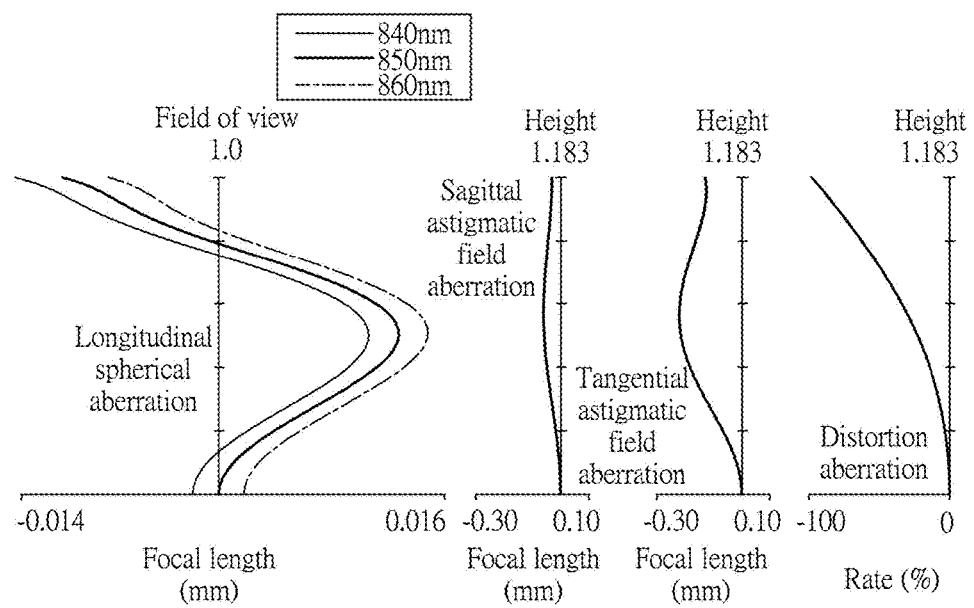
FIG. 7A illustrates the longitudinal spherical aberration on the image plane of the first example.
FIG. 7B illustrates the astigmatic aberration on the sagittal direction of the first example.
FIG. 7C illustrates the astigmatic aberration on the tangential direction of the first example.
FIG. 7D illustrates the distortion aberration of the first example.

Please refer to FIG. 6 which illustrates the first example of the optical imaging lens 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 71D for the distortion aberration. The Y axis of the spherical aberration in each example is "field of view" for 1.0. The Y axis of the astigmatic field and the distortion in each example stands for "image height"(ImgH) which is 1.183 mm.

The optical imaging lens 1 of the first example has four lens elements 10 to 40 with refractive power. The optical imaging lens 1 also has a filter 70, an aperture stop 80, and an image plane 71. The aperture stop 80 is provided between the second lens element 20 and the third lens element 30. The filter 70 may be used for preventing specific wavelength light reaching the image plane to adversely affect the imaging quality.

The first lens element 10 has negative refractive power. The object-side surface 11 facing toward the object side 2 has a convex portion 13 in the vicinity of the optical axis and a convex portion 14 in a vicinity of its periphery. The image-side surface 12 facing toward the image side 3 has a concave portion 16 in the vicinity of the optical axis and a concave portion 17 in a vicinity of its periphery. Besides, both the object-side surface 11 and the image-side surface 12 are aspherical surfaces.

The second lens element 20 has negative refractive power. The object-side surface 21 facing toward the object side 2 has a concave portion 23 in the vicinity of the optical axis and a concave portion 24 in a vicinity of its periphery. The image-side surface 22 facing toward the image side 3 has a concave portion 26 in the vicinity of the optical axis and a concave portion 27 in a vicinity of its periphery. Besides, both the object-side surface 21 and the image-side surface 22 of the second lens element 20 are aspherical surfaces.

The third lens element 30 has positive refractive power. The object-side surface 31 facing toward the object side 2 has a concave portion 33 in the vicinity of the optical axis and a concave portion 34 in a vicinity of its periphery. The image-side surface 32 facing toward the image side 3 has a convex portion 36 in the vicinity of the optical axis and a convex portion 37 in a vicinity of its periphery. Besides, both the object-side surface 31 and the image-side surface 32 of the third lens element 30 are aspherical surfaces.

The fourth lens element 40 has positive refractive power. The object-side surface 41 facing toward the object side 2 has a concave portion 43 in the vicinity of the optical axis and a concave portion 44 in a vicinity of its periphery. The image-side surface 42 facing toward the image side 3 has a convex portion 46 in the vicinity of the optical axis and a convex portion 47 in a vicinity of its periphery. Besides, both the object-side surface 41 and the image-side surface 42 of the fourth lens element 40 are aspherical surfaces.

In the first lens element 10, the second lens element 20, the third lens element 30, the fourth lens element 40 of the optical imaging lens 1 of the present invention, there are 8 surfaces, such as the object-side surfaces 11/21/31/41 and the image-side surfaces 12/22/32/42. If a surface is aspherical, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);
Y represents a vertical distance from a point on the aspherical surface to the optical axis;
K is a conic constant;
$a_i$ is the aspheric coefficient of the $i^{th}$ order.

The optical data of the first example of the optical imaging lens 1 are shown in FIG. 26 while the aspheric surface data are shown in FIG. 27. There is a virtual reference surface (not shown), VRS for short, disposed between an object (not shown) and the first lens element 10. The VRS has a curvature radius of 22 mm to facilitate the display of incident light of a large half field of view. In the present examples of the optical imaging lens, the f-number of the entire optical lens element system is Fno, EFL is the effective focal length, HFOV stands for the half field of view which is half of the field of view of the entire optical lens element system, and the unit for the curvature radius, the thickness and the focal length is in millimeters (mm). TTL is 6.3476 mm. Fno is 2.1. HFOV is 90 degrees.

SECOND EXAMPLE

Figure 8:
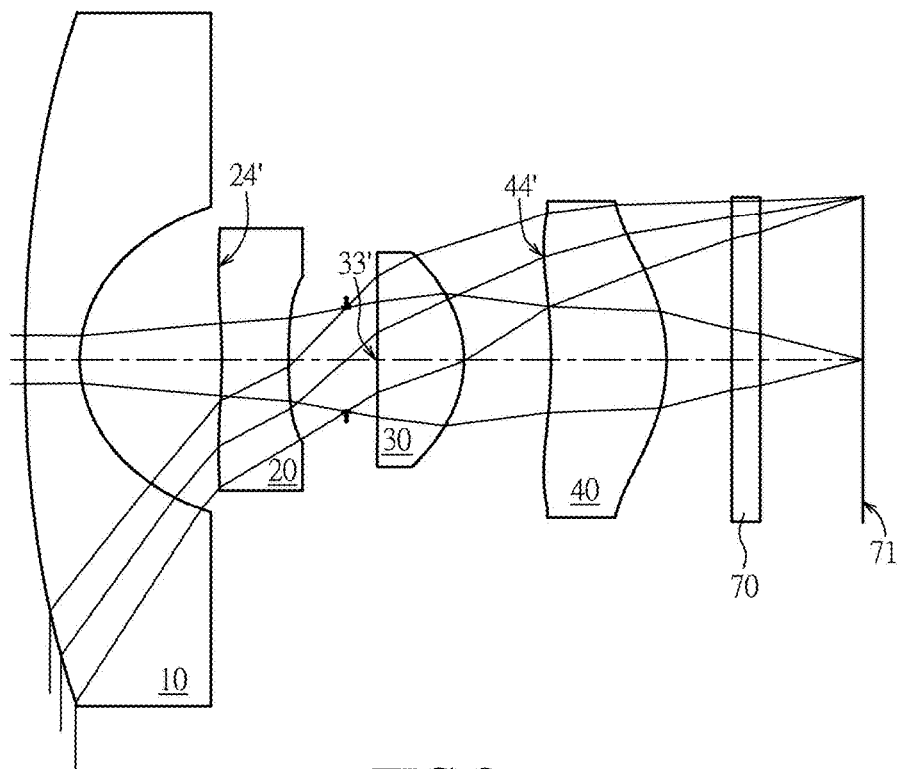
FIG. 8 illustrates a second example of the optical imaging lens of four lens elements of the present invention.
Figures 9A, 9B, 9C, 9D:
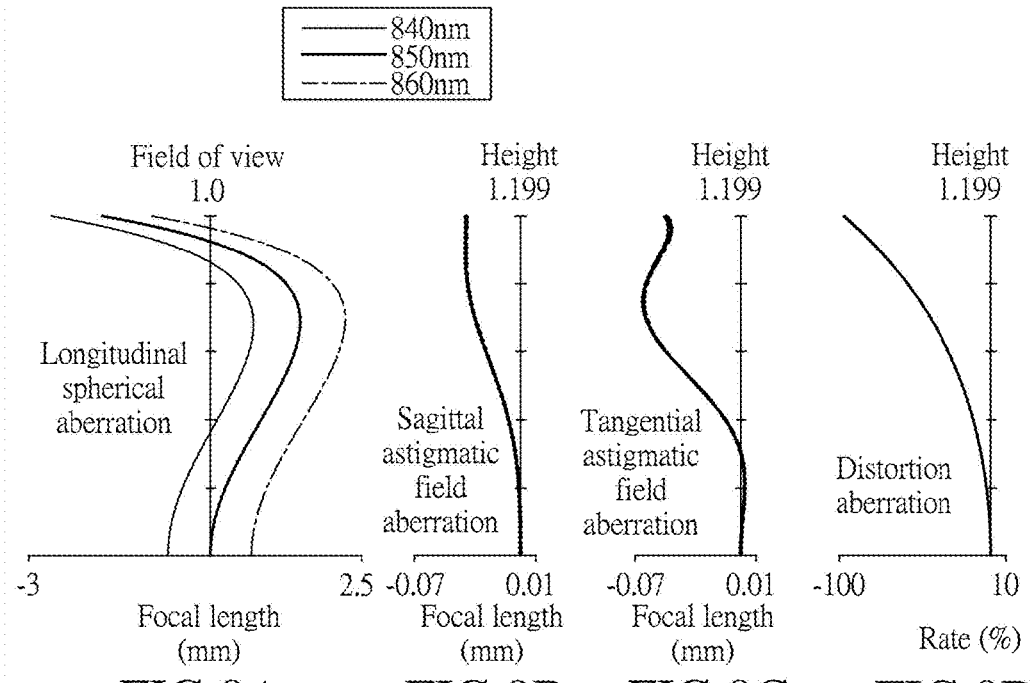
FIG. 9A illustrates the longitudinal spherical aberration on the image plane of the second example.
FIG. 9B illustrates the astigmatic aberration on the sagittal direction of the second example.
FIG. 9C illustrates the astigmatic aberration on the tangential direction of the second example.
FIG. 9D illustrates the distortion aberration of the second example.

Please refer to FIG. 8 which illustrates the second example of the optical imaging lens 1 of the present invention. It is noted that from the second example to the following examples, in order to simplify the figures, only the components different from what the first example has, and the basic lens elements will be labeled in figures. Other components that are the same as what the first example has, such as the object-side surface, the image-side surface, the portion in a vicinity of the optical axis and the portion in a vicinity of its periphery will be omitted in the following examples. Please refer to FIG. 9A for the longitudinal spherical aberration on the image plane 71 of the second example, please refer to FIG. 9B for the astigmatic aberration on the sagittal direction, please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in this example, the aperture stop 80 is provided between the second lens element 20 and the third lens element 30, the object-side surface 21 of the second lens element 20 has a convex portion 24' in a vicinity of its periphery, the object-side surface 31 of the third lens element 30 has a convex portion 33' in the vicinity of the optical axis and the object-side surface 41 of the fourth lens element 40 has a convex portion 44' in a vicinity of its periphery.

The optical data of the second example of the optical imaging lens are shown in FIG. 28 while the aspheric surface data are shown in FIG. 29. TTL is 6.1509 mm. Fno is 2.0. HFOV is 90 degrees. ImgH is 1.199 mm. In particular, 1) the TTL of the second example is shorter than that of the first example of the present invention, and 2) the longitudinal spherical aberration of the second example is better than that of the first example of the present invention.

THIRD EXAMPLE

Figure 10:
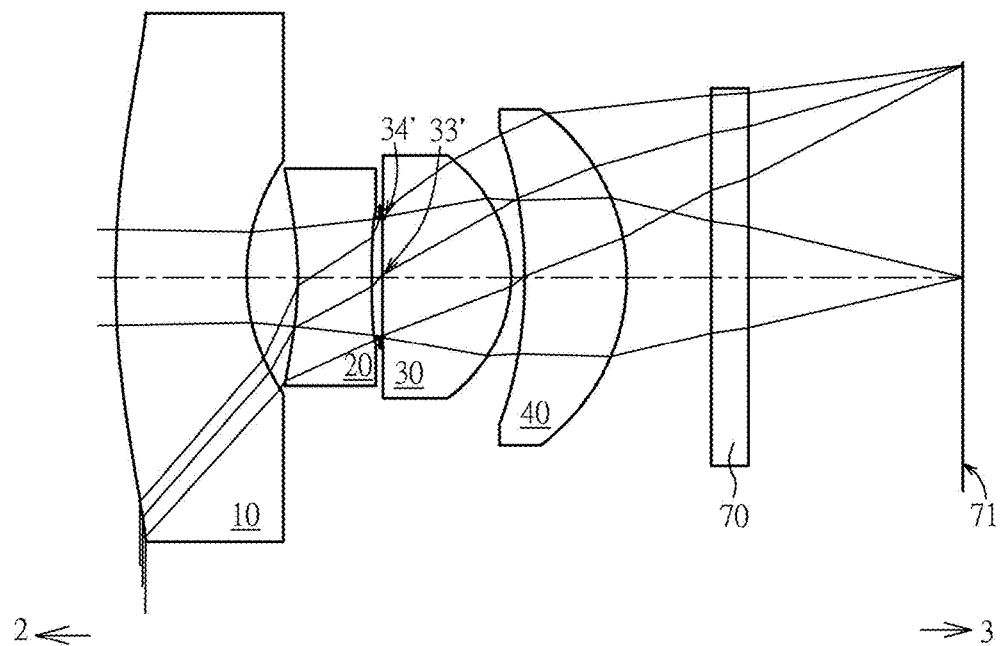
FIG. 10 illustrates a third example of the optical imaging lens of four lens elements of the present invention.
Figures 11A, 11B, 11C, 11D:
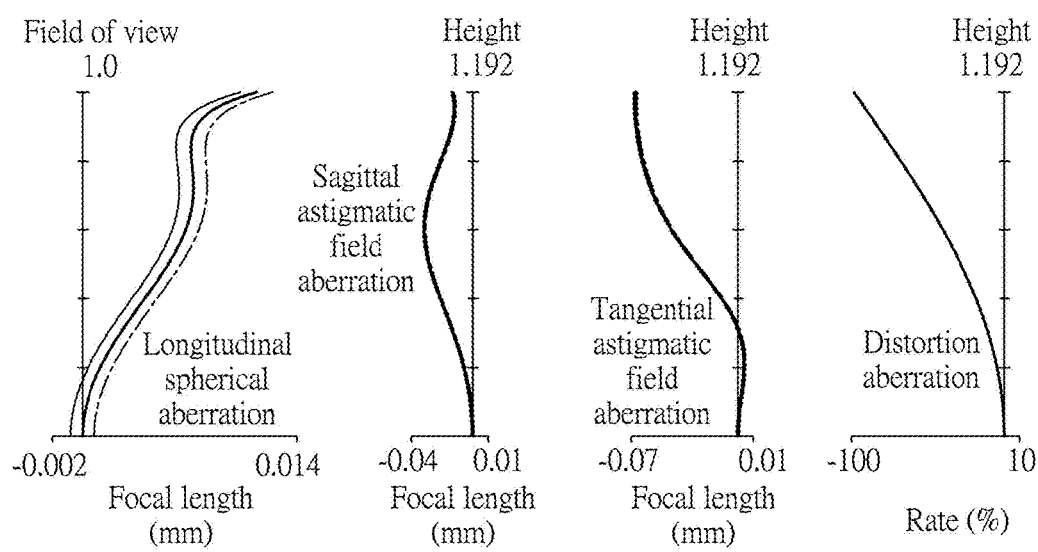
FIG. 11A illustrates the longitudinal spherical aberration on the image plane of the third example.
FIG. 11B illustrates the astigmatic aberration on the sagittal direction of the third example.
FIG. 11C illustrates the astigmatic aberration on the tangential direction of the third example.
FIG. 11D illustrates the distortion aberration of the third example.

Please refer to FIG. 10 which illustrates the third example of the optical imaging lens 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the aperture stop 80 is provided between the second lens element 20 and the third lens element 30, the object-side surface 31 of the third lens element 30 has a convex portion 33' in the vicinity of the optical axis and a convex portion 34' in a vicinity of its periphery.

The optical data of the third example of the optical imaging lens are shown in FIG. 30 while the aspheric surface data are shown in FIG. 31. TTL is 4.7622 mm. Fno is 2.2. HFOV is 90 degrees. ImgH is 1.192 mm. In particular, 1) the TTL of the third example is shorter than that of the first example of the present invention, 2) the Fno of the third example is larger than that of the first example of the present invention, 3) the longitudinal spherical aberration of the third example is better than that of the first example of the present invention, and 4) the aberration of the third example is better than that of the first example of the present invention.

FOURTH EXAMPLE

Figure 12:
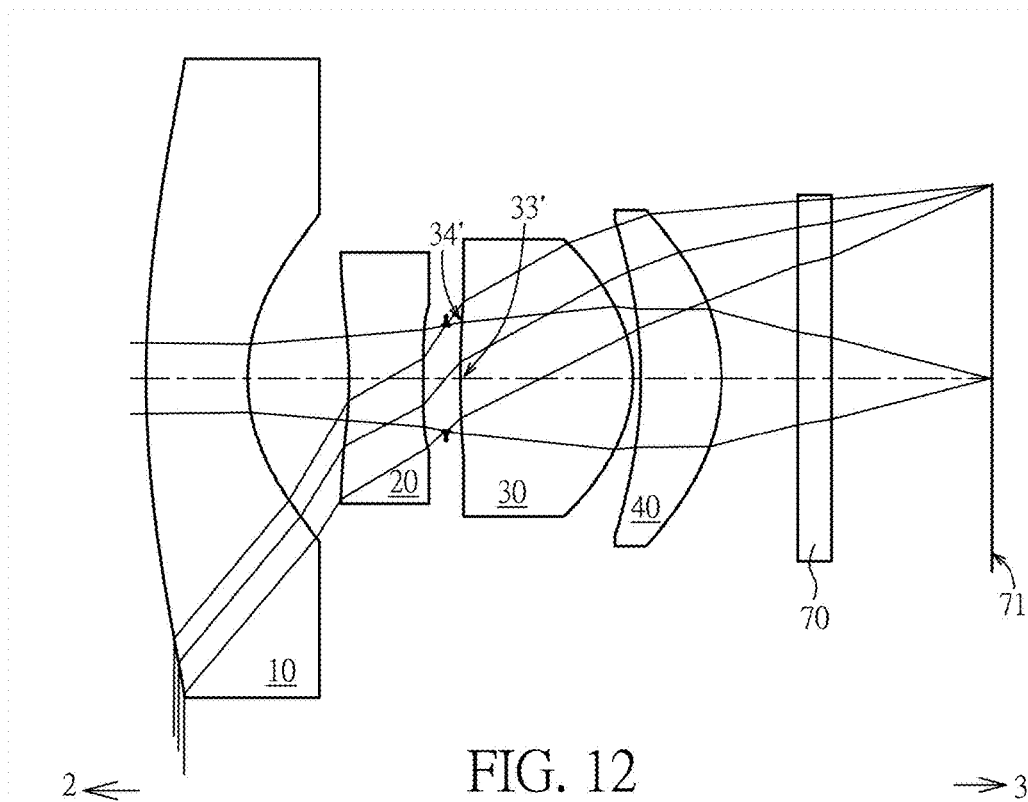
FIG. 12 illustrates a fourth example of the optical imaging lens of four lens elements of the present invention.
Figures 13A, 13B, 13C, 13D:
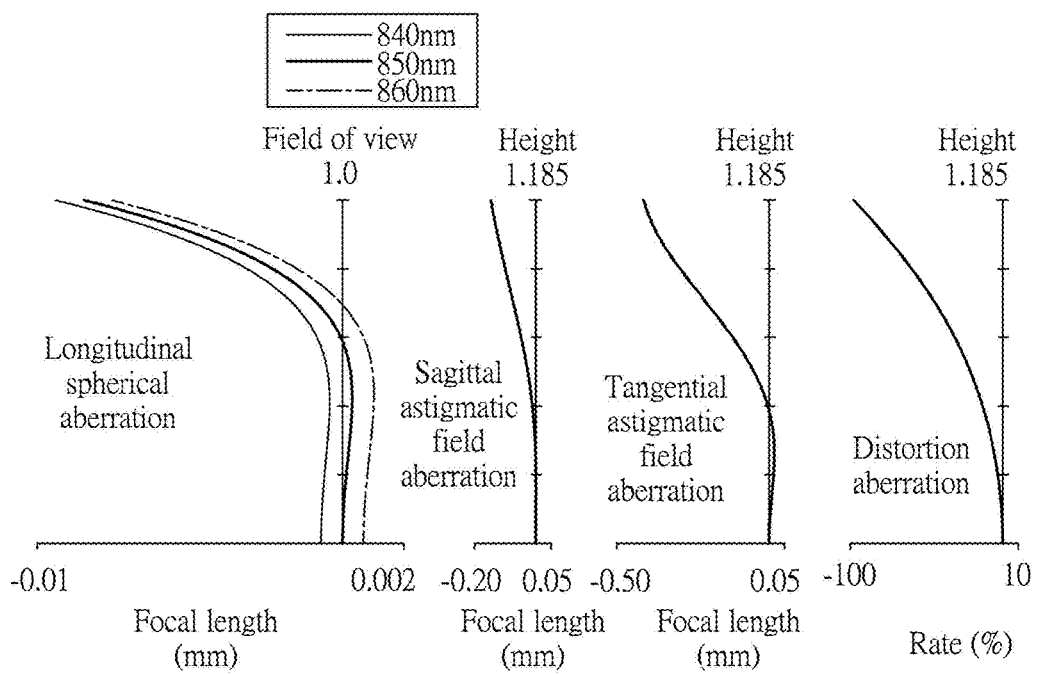
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the aperture stop 80 is provided between the second lens element 20 and the third lens element 30, the object-side surface 31 of the third lens element 30 has a convex portion 33' in the vicinity of the optical axis and a convex portion 34' in a vicinity of its periphery.

The optical data of the fourth example of the optical imaging lens are shown in FIG. 32 while the aspheric surface data are shown in FIG. 33. TTL is 5.2838 mm. Fno is 2.0. HFOV is 90 degrees. ImgH is 1.185 mm. In particular, 1) the TTL of the fourth example is shorter than that of the first example of the present invention, 2) the longitudinal spherical aberration of the fourth example is better than that of the first example of the present invention.

FIFTH EXAMPLE

Figure 14:
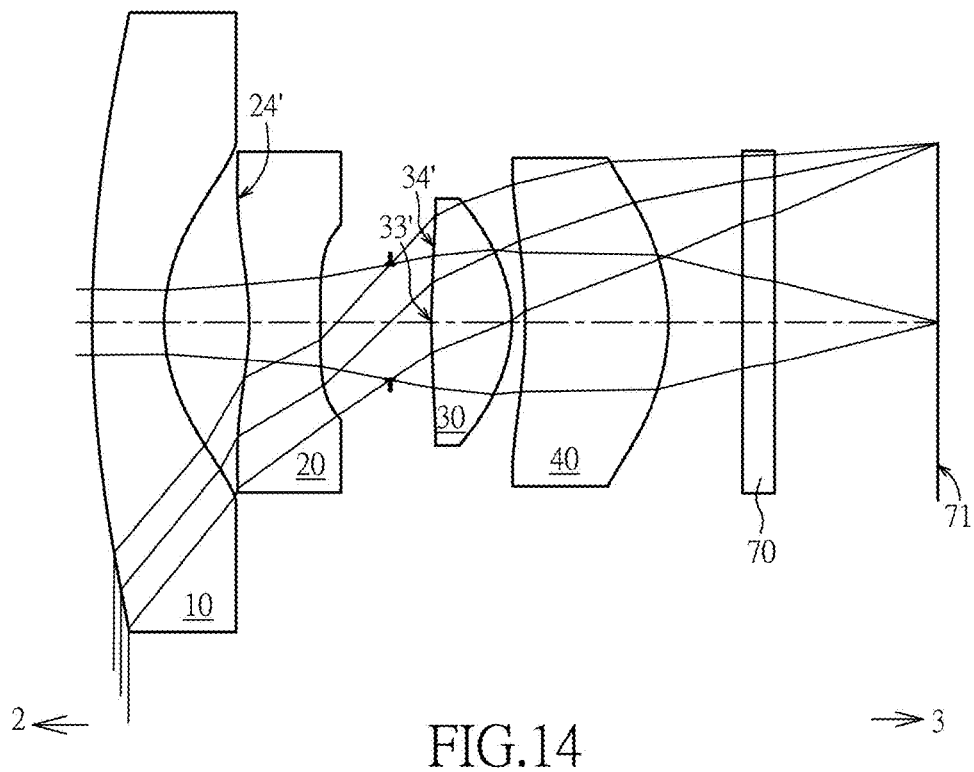
FIG. 14 illustrates a fifth example of the optical imaging lens of four lens elements of the present invention.
Figures 15A, 15B, 15C, 15D:
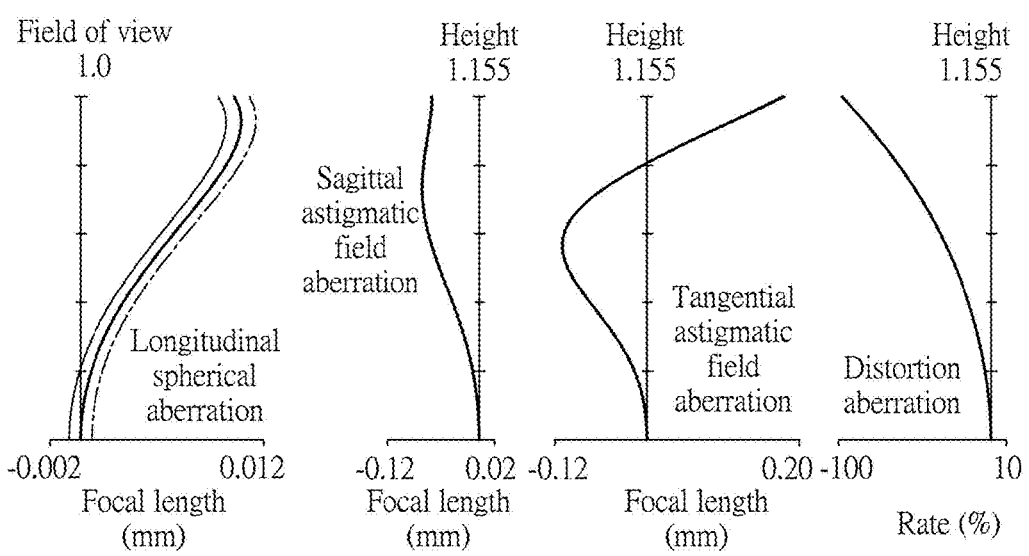
FIG. 15A illustrates the longitudinal spherical aberration on the image plane of the fifth example.
FIG. 15B illustrates the astigmatic aberration on the sagittal direction of the fifth example.
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in this example, the aperture stop 80 is provided between the second lens element 20 and the third lens element 30, the object-side surface 21 of the second lens element 20 has a convex portion 24' in a vicinity of its periphery, the object-side surface 31 of the third lens element 30 has a convex portion 33' in the vicinity of the optical axis and a convex portion 34' in a vicinity of its periphery.

The optical data of the fifth example of the optical imaging lens are shown in FIG. 34 while the aspheric surface data are shown in FIG. 35. TTL is 5.4824 mm. Fno is 2.0. HFOV is 90 degrees. ImgH is 1.155 mm. In particular, 1) the TTL of the fifth example is shorter than that of the first example of the present invention, 2) the longitudinal spherical aberration of the fifth example is better than that of the first example of the present invention.

SIXTH EXAMPLE

Figure 16:
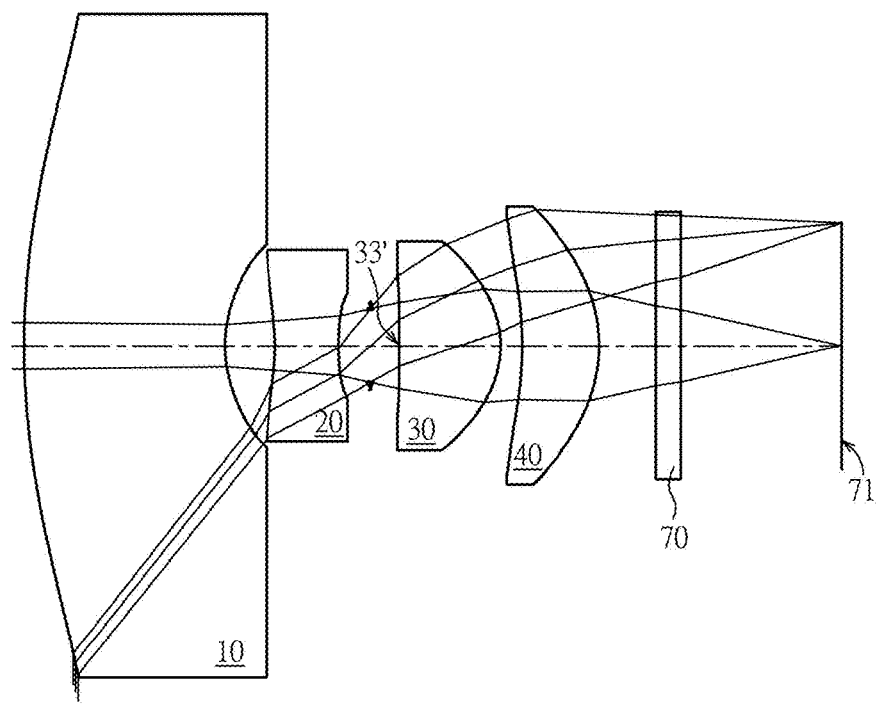
FIG. 16 illustrates a sixth example of the optical imaging lens of four lens elements of the present invention.
Figures 17A, 17B, 17C, 17D:
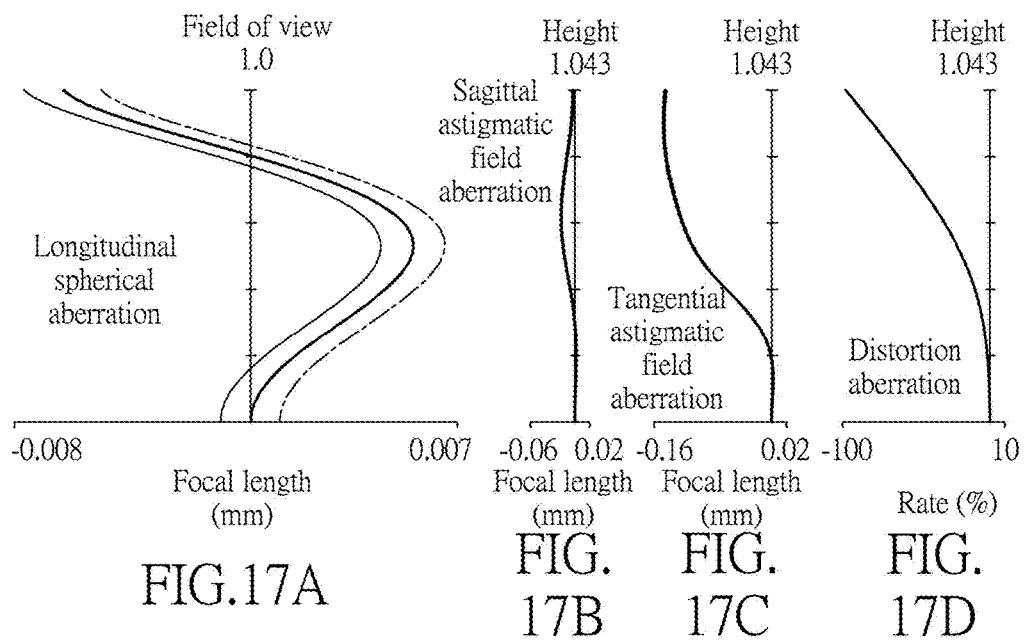
FIG. 17A illustrates the longitudinal spherical aberration on the image plane of the sixth example.
FIG. 17B illustrates the astigmatic aberration on the sagittal direction of the sixth example.
FIG. 17C illustrates the astigmatic aberration on the tangential direction of the sixth example.
FIG. 17D illustrates the distortion aberration of the sixth example.

Please refer to FIG. 16 which illustrates the sixth example of the optical imaging lens 1 of the present invention. Please refer to FIG. 17A for the longitudinal spherical aberration on the image plane 71 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the aperture stop 80 is provided between the second lens element 20 and the third lens element 30, the object-side surface 31 of the third lens element 30 has a convex portion 33' in the vicinity of the optical axis.

The optical data of the sixth example of the optical imaging lens are shown in FIG. 36 while the aspheric surface data are shown in FIG. 37. TTL is 6.8982 mm. Fno is 2.2. HFOV is 90 degrees. ImgH is 1.043 mm. In particular, 1) the longitudinal spherical aberration of the sixth example is better than that of the first example of the present invention, 2) the Fno of the sixth example is larger than that of the first example of the present invention, 3) the aberration of the sixth example is better than that of the first example of the present invention.

SEVENTH EXAMPLE

Figure 18:
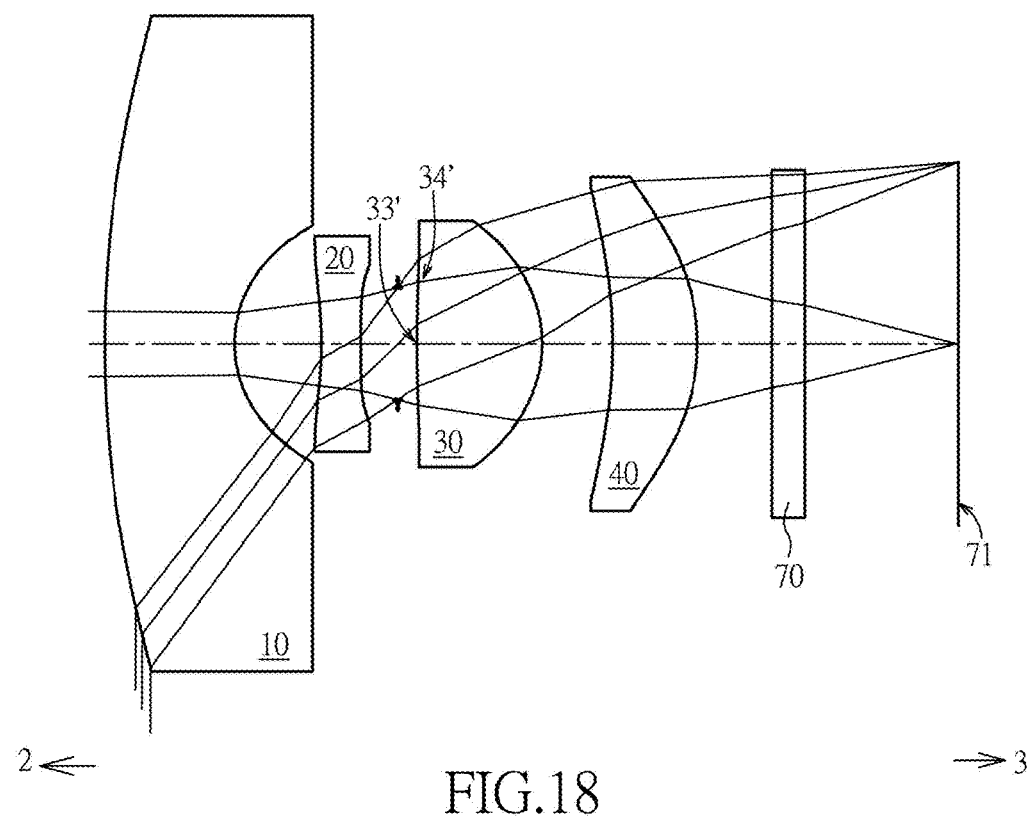
FIG. 18 illustrates a seventh example of the optical imaging lens of four lens elements of the present invention.
Figures 19A, 19B, 19C, 19D:
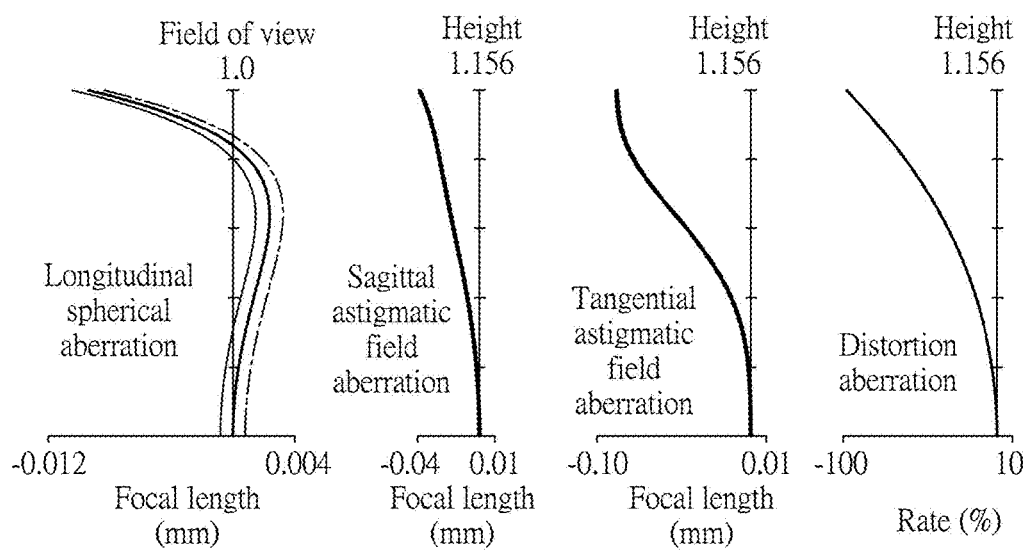
FIG. 19A illustrates the longitudinal spherical aberration on the image plane of the seventh example.
FIG. 19B illustrates the astigmatic aberration on the sagittal direction of the seventh example.
FIG. 19C illustrates the astigmatic aberration on the tangential direction of the seventh example.
FIG. 19D illustrates the distortion aberration of the seventh example.

Please refer to FIG. 18 which illustrates the seventh example of the optical imaging lens 1 of the present invention. Please refer to FIG. 19A for the longitudinal spherical aberration on the image plane 71 of the seventh example; please refer to FIG. 19B for the astigmatic aberration on the sagittal direction; please refer to FIG. 19C for the astigmatic aberration on the tangential direction, and please refer to FIG. 19D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the aperture stop 80 is provided between the second lens element 20 and the third lens element 30, the object-side surface 31 of the third lens element 30 has a convex portion 33' in the vicinity of the optical axis and a convex portion 34' in a vicinity of its periphery.

The optical data of the seventh example of the optical imaging lens are shown in FIG. 38 while the aspheric surface data are shown in FIG. 39. TTL is 5.4489 mm. Fno is 2.0. HFOV is 90 degrees. ImgH is 1.156 mm. In particular, 1) the TTL of the seventh example is shorter than that of the first example of the present invention, 2) the longitudinal spherical aberration of the seventh example is better than that of the first example of the present invention, and 3) the aberration of the seventh example is better than that of the first example of the present invention.

EIGHTH EXAMPLE

Figure 20:
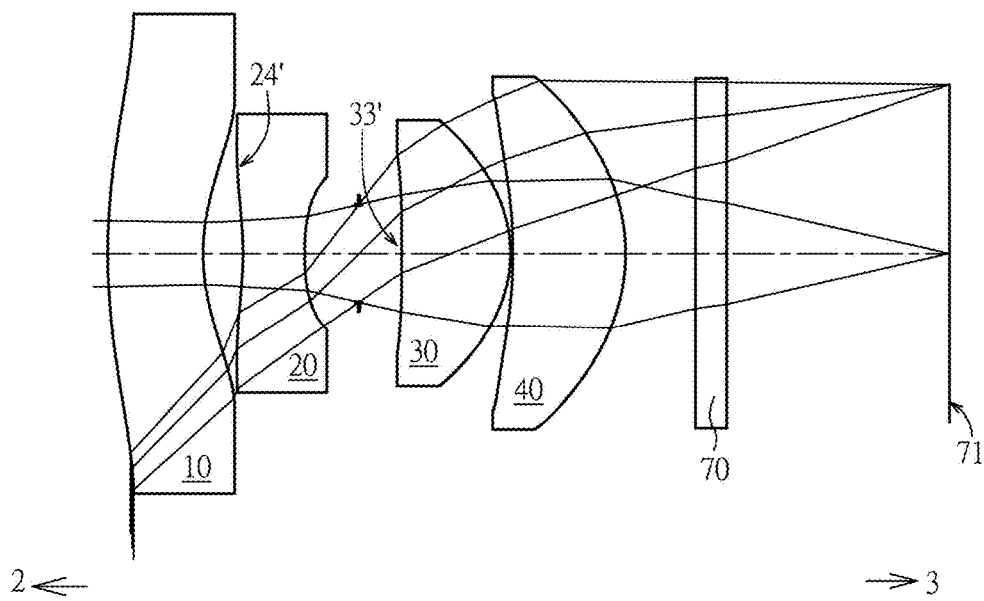
FIG. 20 illustrates an eighth example of the optical imaging lens of four lens elements of the present invention.
Figures 21A, 21B, 21C, 21D:
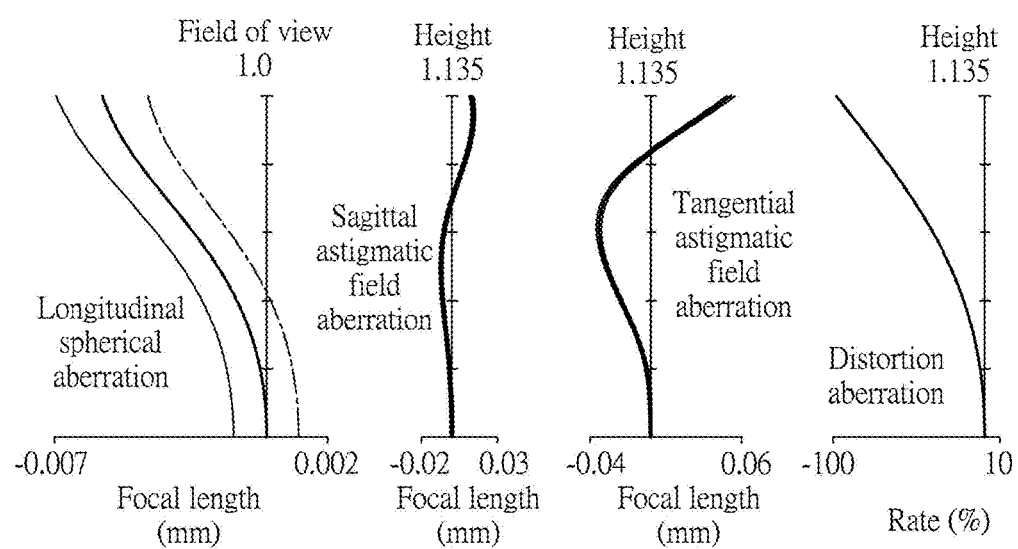
FIG. 21A illustrates the longitudinal spherical aberration on the image plane of the eighth example.
FIG. 21B illustrates the astigmatic aberration on the sagittal direction of the eighth example.
FIG. 21C illustrates the astigmatic aberration on the tangential direction of the eighth example.
FIG. 21D illustrates the distortion aberration of the eighth example.

Please refer to FIG. 20 which illustrates the eighth example of the optical imaging lens 1 of the present invention. Please refer to FIG. 21A for the longitudinal spherical aberration on the image plane 71 of the eighth example; please refer to FIG. 21B for the astigmatic aberration on the sagittal direction; please refer to FIG. 21C for the astigmatic aberration on the tangential direction, and please refer to FIG. 21D for the distortion aberration. The components in the eighth example are similar to those in the first example, but the optical data such as the curvature radius, the refractive power, the lens thickness, the lens focal length, the aspheric surface or the back focal length in this example are different from the optical data in the first example, and in this example, the aperture stop 80 is provided between the second lens element 20 and the third lens element 30, the object-side surface 21 of the second lens element 20 has a convex portion 24' in a vicinity of its periphery, and the object-side surface 31 of the third lens element 30 has a convex portion 33' in the vicinity of the optical axis.

The optical data of the eighth example of the optical imaging lens are shown in FIG. 40 while the aspheric surface data are shown in FIG. 41. TTL is 5.7005 mm. Fno is 2.2. HFOV is 90 degrees. ImgH is 1.135 mm. In particular, 1) the TTL of the eighth example is shorter than that of the first example of the present invention, 2) the Fno of the eighth example is larger than that of the first example of the present invention, 3) the longitudinal spherical aberration of the eighth example is better than that of the first example of the present invention, and 4) the aberration of the eighth example is better than that of the first example of the present invention.

NINTH EXAMPLE

Figure 22:
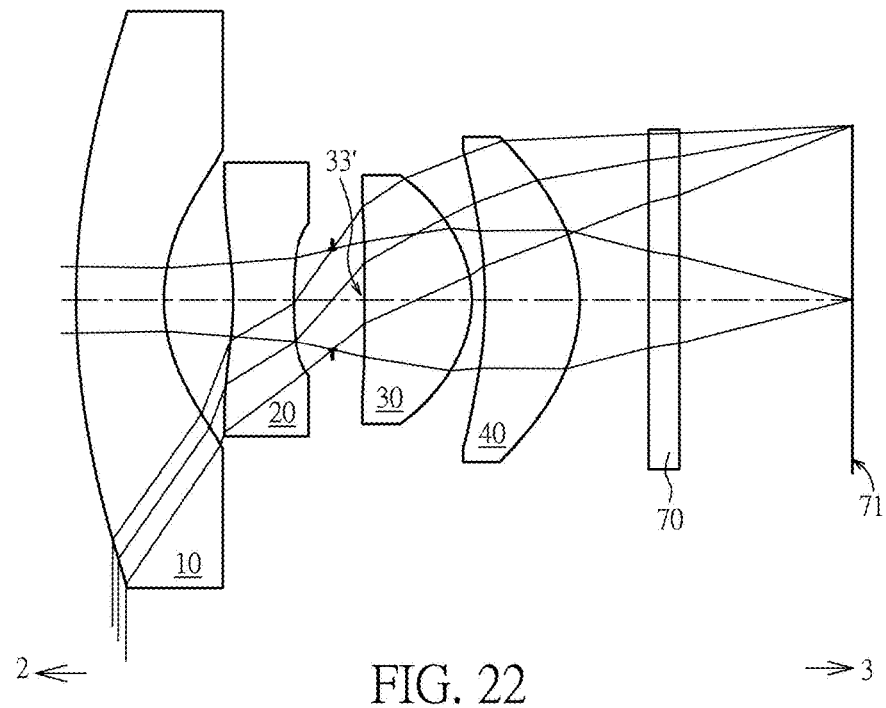
FIG. 22 illustrates a ninth example of the optical imaging lens of four lens elements of the present invention.
Figures 23A, 23B, 23C, 23D:
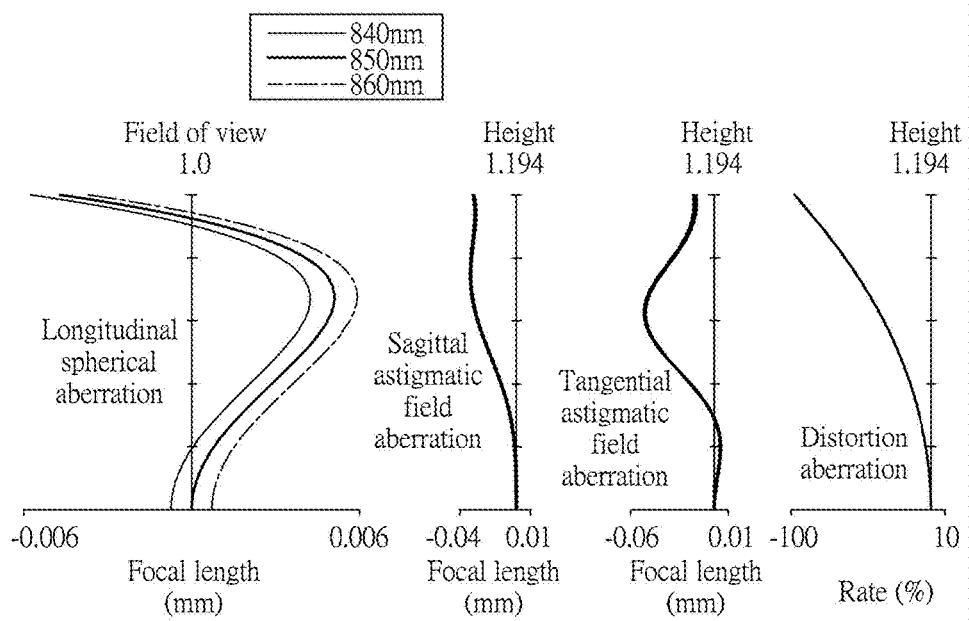
FIG. 23A illustrates the longitudinal spherical aberration on the image plane of the ninth example.
FIG. 23B illustrates the astigmatic aberration on the sagittal direction of the ninth example.
FIG. 23C illustrates the astigmatic aberration on the tangential direction of the ninth example.
FIG. 23D illustrates the distortion aberration of the ninth example.

Please refer to FIG. 22 which illustrates the ninth example of the optical imaging lens 1 of the present invention. Please refer to FIG. 23A for the longitudinal spherical aberration on the image plane 71 of the ninth example; please refer to FIG. 23B for the astigmatic aberration on the sagittal direction; please refer to FIG. 23C for the astigmatic aberration on the tangential direction, and please refer to FIG. 23D for the distortion aberration. The components in the ninth example are similar to those in the first example, but the optical data such as the curvature radius, the refractive power, the lens thickness, the lens focal length, the aspheric surface or the back focal length in this example are different from the optical data in the first example, and in this example, the aperture stop 80 is provided between the second lens element 20 and the third lens element 30, the object-side surface 31 of the third lens element 30 has a convex portion 33' in the vicinity of the optical axis.

The optical data of the ninth example of the optical imaging lens are shown in FIG. 42 while the aspheric surface data are shown in FIG. 43. TTL is 5.3347 mm. Fno is 2.0. HFOV is 90 degrees. ImgH is 1.194 mm. In particular, 1) the TTL of the ninth example is shorter than that of the first example of the present invention, 2) the longitudinal spherical aberration of the ninth example is better than that of the first example of the present invention, and 3) the aberration of the ninth example is better than that of the first example of the present invention.

TENTH EXAMPLE

Figure 24:
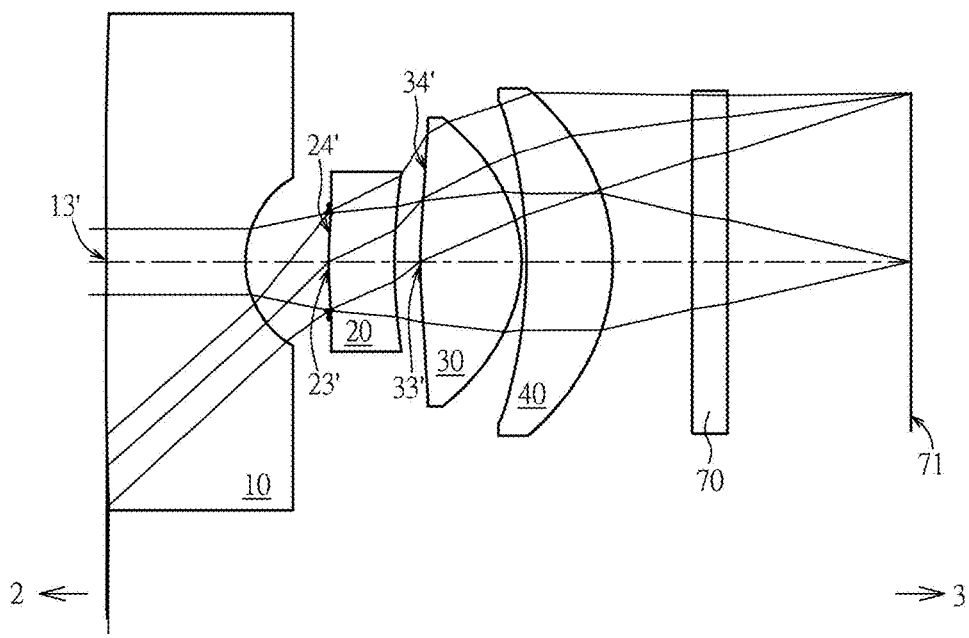
FIG. 24 illustrates a tenth example of the optical imaging lens of four lens elements of the present invention.
Figures 25A, 25B, 25C, 25D:
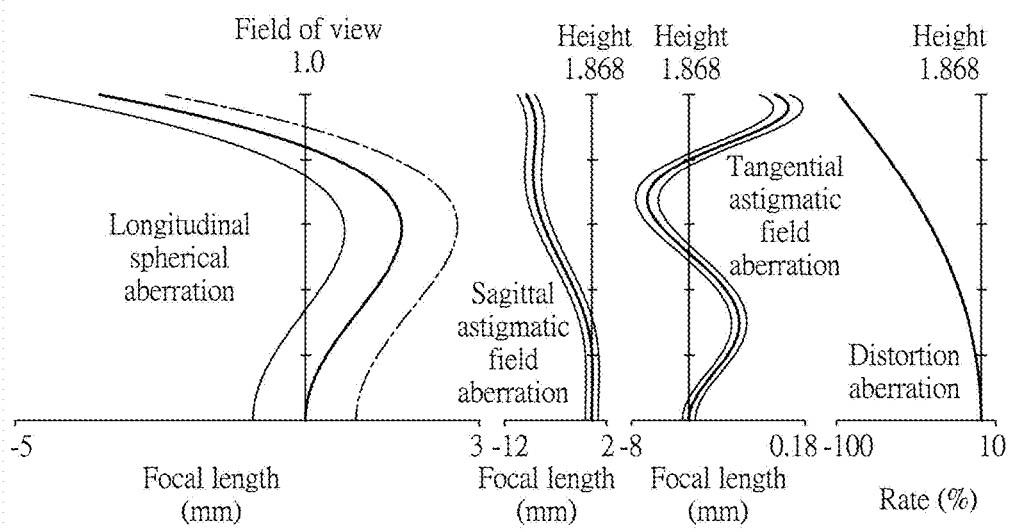
FIG. 25A illustrates the longitudinal spherical aberration on the image plane of the tenth example.
FIG. 25B illustrates the astigmatic aberration on the sagittal direction of the tenth example.
FIG. 25C illustrates the astigmatic aberration on the tangential direction of the tenth example.
FIG. 25D illustrates the distortion aberration of the tenth example.

Please refer to FIG. 24 which illustrates the tenth example of the optical imaging lens 1 of the present invention. Please refer to FIG. 25A for the longitudinal spherical aberration on the image plane 71 of the tenth example; please refer to FIG. 25B for the astigmatic aberration on the sagittal direction; please refer to FIG. 25C for the astigmatic aberration on the tangential direction, and please refer to FIG. 25D for the distortion aberration. The components in the tenth example are similar to those in the first example, but the optical data such as the curvature radius, the refractive power, the lens thickness, the lens focal length, the aspheric surface or the back focal length in this example are different from the optical data in the first example, and in this example, the aperture stop 80 is provided between the first lens element 10 and the second lens element 20, the object-side surface 11 of the first lens element 10 has a concave portion 13' in the vicinity of the optical axis, the object-side surface 21 of the second lens element 20 has a convex portion 23' in the vicinity of the optical axis and a convex portion 24' in a vicinity of its periphery, the object-side surface 31 of the third lens element 30 has a convex portion 33' in the vicinity of the optical axis and a convex portion 34' in a vicinity of its periphery.

The optical data of the tenth example of the optical imaging lens are shown in FIG. 44 while the aspheric surface data are shown in FIG. 45. TTL is 4.8042 mm. Fno is 2.2. HFOV is 90 degrees. ImgH is 1.868 mm. In particular, 1) the TTL of the tenth example is shorter than that of the first example of the present invention, and 2) the Fno of the tenth example is larger than that of the first example of the present invention.

Some important ratios in each example are shown in FIG. 46 and in FIG. 47. The distance between the image-side surface 42 of the fourth lens element 40 to the filter 70 along the optical axis 4 is G4F; the thickness of the filter 70 along the optical axis 4 is TF; the distance between the filter 70 to the image plane 71 along the optical axis 4 is GFP; the distance between the image-side surface 42 of the fourth lens element 40 and the image plane 71 along the optical axis 4 is BFL. Therefore, BFL=G4F+TF+GFP.

In the light of the above examples, the inventors observe at least the following features of the lens arrangement of the present invention and the corresponding efficacy. For instance:

1. The aperture stop 80 is disposed between the first lens element 10 and the third lens element 30 to go with that the first lens element 10 has negative refractive power, the second lens element 20 has negative refractive power and an image-side surface 22 with a concave portion 26 in a vicinity of the optical-axis to facilitate the increase of the half field of view without affecting Fno and ImgH, preferably stop 80 disposed between the second lens element 20 and the third lens element 30. At least one of the object-side surface 31 and of the image-side surface 32 of the third lens 30 is an aspherical surface to facilitate the correction of the aberration which is caused by the first two lens elements. The fourth lens element 40 has an object-side surface 41 with a concave portion 43 in a vicinity of the optical-axis to facilitate the correction of the aberration which is caused by the third lens element 30.

2. When the conditional formulae 45≤v1≤65 are satisfied, it is advantageous to choose materials for lens elements of Abbe number between 45~65 to increase the half field of view while to decrease the chromatic aberration which is caused by the first lens element 10.

3. When the conditional formulae 18≤v4≤35 are satisfied, it is advantageous to choose materials for lens elements of Abbe number between 18~35 to decrease the chromatic aberration which is caused by the fourth lens element 40 and to assist the adjustment of the chromatic aberration of the entire optical imaging lens 1.

The following conditional formulae are provided to keep the optical parameters and the focal length of the optical imaging lens 1 in a suitable range so the parameters are not too small to fabricate or to assemble the optical imaging lens set or so great to jeopardize the correction of the entire aberration of the optical imaging lens 1.

(EFL+ALT)/BFL≤2.40, preferably 0.85≤(EFL+ALT)/BFL≤2.40; (a)

(EFL+AAG)/(T2+T4)≤2.80, preferably 0.95≤(EFL+AAG)/(T2+T4)≤2.80. (b)

The following conditional formulae are provided to keep the thickness and the air gaps in a suitable range so the parameters are not too small to fabricate or to assemble the optical imaging lens set or so great to jeopardize the decrease in total length of the optical imaging lens 1.

(G12+G23)/T1≤4.20, preferably 0.35≤(G12+G23)/T1≤4.20; (c)

(G12+G23)/T2≤4.20, preferably 0.7≤(G12+G23)/T2≤4.20; (d)

(G23+G34+T4)/T2≤5.50, preferably 1.33≤(G23+G34+T4)/T2≤5.50; (e)

(T2+G23)/T1≤3.20, preferably 0.62≤(T2+G23)/T1≤3.20; (f)

(T3+G23)/T4≤2.60, preferably 0.84≤(T3+G23)/T4≤2.60; (g)

(T4+G23)/T3≤3.30, preferably 0.57≤(T4+G23)/T3≤3.30; (h)

(T1+G34)/G12≤4.50, preferably 1≤(T1+G34)/G12≤4.50; (i)

(T3+G34)/T1≤3.20, preferably 0.6≤(T3+G34)/T1≤3.20; (j)

(G12+G23)/T4≤2.00, preferably 0.6≤(G12+G23)/T4≤2.00; (k)

(G12+G34)/T2≤4.00, preferably 0.3≤(G12+G34)/T2≤4.00; (l)

(T1+G23)/T3≤2.60, preferably 0.67≤T1+G23)/T3≤2.60; (m)

(T2+G23)/G12≤7.00, preferably 1.09≤(T2+G23)/G12≤7.00; (n)

(T3+G23)/T1≤3.20, preferably 0.64≤(T3+G23)/T1≤3.20; (o)

(T4+G23)/T2≤3.60, preferably 1.11≤(T4+G23)/T2≤3.60; (p)

(T4+G34)/G12≤3.60, preferably 0.52≤(T4+G34)/G12≤3.60; (q)

(T3+G34)/G12≤2.80, preferably 1≤(T3+G34)/G12≤2.80. (r)

The above-mentioned one or more conditions may be optionally combined in the embodiments of the present invention to facilitate the design of the present invention.

In the light of the unpredictability of the optical imaging lens, the present invention suggests the above principles to have a shorter total length of the optical imaging lens, a larger aperture available, better imaging quality or a better fabrication yield to overcome the drawbacks of prior art.

The above limitations may be properly combined at the discretion of persons who practice the present invention and they are not limited as shown above. In addition to the above ratios, the curvatures of each lens element or multiple lens elements may be fine-tuned to result in more fine structures to enhance the system performance or the resolution control. For example, the object-side surface of the first lens element may additionally have a convex portion in the vicinity of the optical axis. The above limitations may be properly combined in the embodiments without causing inconsistency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side toward an image side in order along an optical axis comprising: a first lens element, a second lens element, a third lens element and a fourth lens element, said first lens element to said fourth lens element each having an object-side surface facing toward the object side as well as an image-side surface facing toward the image side, and an aperture stop disposed between said first lens element and said third lens element, wherein:

said first lens element has negative refractive power;

said second lens element has negative refractive power and said image-side surface of said second lens element has a concave portion in a vicinity of said optical-axis;

at least one of said object-side surface and of said image-side surface of said third lens is an aspherical surface and a third lens element thickness of said third lens element along said optical axis is greater than a second lens element thickness of said second lens element along said optical axis;

said object-side surface of said fourth lens element has a concave portion in a vicinity of said optical-axis and at least one of said object-side surface and of said image-side surface of said fourth lens element is an aspherical surface; and lens elements having refractive power included by the optical imaging lens are only the four lens elements described above, and said first lens element has an Abbe number v1, said first lens element has a first lens element thickness T1 along said optical axis, an air gap G12 is between said first lens element and said second lens element along said optical axis and an air gap G23 is between said second lens element and said third lens element along said optical axis to satisfy 45≤v1≤65 and (G12+G23)/T1≤4.20.

2. The optical imaging lens of claim 1, wherein EFL is an effective focal length of the optical imaging lens, ALT is a total thickness of all said four lens elements and BFL is a distance between said image-side surface of said fourth lens element and an image plane along said optical axis to satisfy (EFL+ALT)/BFL≤2.40.

3. The optical imaging lens of claim 1, wherein said second lens element has a second lens element thickness T2 along said optical axis to satisfy (G12+G23)/T2≤4.20.

4. The optical imaging lens of claim 1, wherein said second lens element has a second lens element thickness T2 along said optical axis, said fourth lens element has a fourth lens element thickness T4 along said optical axis and an air gap G34 is between said third lens element and said fourth lens element along said optical axis to satisfy (G23+G34+T4)/T2≤5.50.

5. The optical imaging lens of claim 1, wherein said second lens element has a second lens element thickness T2 along said optical axis to satisfy (T2+G23)/T1≤3.20.

6. The optical imaging lens of claim 1, wherein said third lens element has a third lens element thickness T3 along said optical axis, said fourth lens element has a fourth lens element thickness T4 along said optical axis to satisfy (T3+G23)/T4≤2.60.

7. The optical imaging lens of claim 1, wherein said third lens element has a third lens element thickness T3 along said optical axis, said fourth lens element has a fourth lens element thickness T4 along said optical axis to satisfy (T4+G23)/T3≤3.30.

8. The optical imaging lens of claim 1, wherein an air gap G34 is between said third lens element and said fourth lens element along said optical axis to satisfy (T1+G34)/G12≤4.50.

9. The optical imaging lens of claim 1, wherein said third lens element has a third lens element thickness T3 along said optical axis and an air gap G34 is between said third lens element and said fourth lens element along said optical axis to satisfy (T3+G34)/T1≤3.20.

10. An optical imaging lens, from an object side toward an image side in order along an optical axis comprising: a first lens element, a second lens element, a third lens element, and a fourth lens element, said first lens element to said fourth lens element each having an object-side surface facing toward the object side as well as an image-side surface facing toward the image side, and an aperture stop disposed between said first lens element and said third lens element, wherein:
    said first lens element has negative refractive power;
    said second lens element has negative refractive power and said image-side surface of said second lens element has a concave portion in a vicinity of said optical-axis;
    at least one of said object-side surface and of said image-side surface of said third lens is an aspherical surface and a third lens element thickness of said third lens element along said optical axis is greater than a second lens element thickness of said second lens element along said optical axis;
    said object-side surface of said fourth lens element has a concave portion in a vicinity of said optical-axis; and
    lens elements having refractive power included by the optical imaging lens are only the four lens elements described above and said fourth lens element has an Abbe number v4 to satisfy 18≤v4≤35.

11. The optical imaging lens of claim 10, wherein AAG is a sum of all three air gaps between each lens elements from said first lens element to said fourth lens element along said optical axis, EFL is an effective focal length of the optical imaging lens, said second lens element has a second lens element thickness T2 along said optical axis and said fourth lens element has a fourth lens element thickness T4 along said optical axis to satisfy (EFL+AAG)/(T2+T4)≤2.80.

12. The optical imaging lens of claim 10, wherein said fourth lens element has a fourth lens element thickness T4 along said optical axis, an air gap G12 is between said first lens element and said second lens element along said optical axis and an air gap G23 is between said second lens element and said third lens element along said optical axis to satisfy (G12+G23)/T4≤2.00.

13. The optical imaging lens of claim 10, wherein said second lens element has a second lens element thickness T2 along said optical axis, an air gap G12 is between said first lens element and said second lens element along said optical axis and an air gap G34 is between said third lens element and said fourth lens element along said optical axis to satisfy (G12+G34)/T2≤4.00.

14. The optical imaging lens of claim 10, wherein said first lens element has a first lens element thickness T1 along said optical axis, said third lens element has a third lens element thickness T3 along said optical axis and an air gap G23 is between said second lens element and said third lens element along said optical axis to satisfy (T1+G23)/T3≤2.60.

15. The optical imaging lens of claim 10, wherein said second lens element has a second lens element thickness T2 along said optical axis, an air gap G12 is between said first lens element and said second lens element along said optical axis and an air gap G23 is between said second lens element and said third lens element along said optical axis to satisfy (T2+G23)/G12≤7.00.

16. The optical imaging lens of claim 10, wherein said first lens element has a first lens element thickness T1 along said optical axis, said third lens element has a third lens element thickness T3 along said optical axis and an air gap G23 is between said second lens element and said third lens element along said optical axis to satisfy (T3+G23)/T1≤3.20.

17. The optical imaging lens of claim 10, wherein said second lens element has a second lens element thickness T2 along said optical axis, said fourth lens element has a fourth lens element thickness T4 along said optical axis and an air gap G23 is between said second lens element to satisfy (T4+G23)/T2≤3.60.

18. The optical imaging lens of claim 10, wherein said fourth lens element has a fourth lens element thickness T4 along said optical axis, an air gap G12 is between said first lens element and said second lens element along said optical axis and an air gap G34 is between said third lens element and said fourth lens element along said optical axis to satisfy (T4+G34)/G12≤3.60.

19. The optical imaging lens of claim 1, wherein said third lens element has a third lens element thickness T3 along said optical axis, an air gap G12 is between said first lens element and said second lens element along said optical axis and an air gap G34 is between said third lens element and said fourth lens element along said optical axis to satisfy (T3+G34)/G12≤2.80.

* * * * *